United States Patent
Stepanov et al.

(10) Patent No.: US 7,653,281 B2
(45) Date of Patent: Jan. 26, 2010

(54) EMBEDDED CHANNELS, EMBEDDED WAVEGUIDES AND METHODS OF MANUFACTURING AND USING THE SAME

(75) Inventors: Stanislav Stepanov, Tel Aviv (IL); Shlomo Ruschin, Herzlia (IL)

(73) Assignee: Ramot At Tel-Aviv University Ltd., Tel-Aviv (IL)

( * ) Notice: Subject to any disclaimer, the term of this patent is extended or adjusted under 35 U.S.C. 154(b) by 92 days.

(21) Appl. No.: 11/574,509

(22) PCT Filed: Sep. 4, 2005

(86) PCT No.: PCT/IL2005/000938

§ 371 (c)(1),
(2), (4) Date: Mar. 1, 2007

(87) PCT Pub. No.: WO2006/025064

PCT Pub. Date: Mar. 9, 2006

(65) Prior Publication Data

US 2008/0317423 A1    Dec. 25, 2008

Related U.S. Application Data

(60) Provisional application No. 60/606,467, filed on Sep. 2, 2004.

(51) Int. Cl.
*G02B 6/10* (2006.01)
*C03B 37/022* (2006.01)
*C03B 37/027* (2006.01)
*H01L 21/00* (2006.01)

(52) U.S. Cl. ................. 385/132; 385/129; 385/130; 385/146; 65/385; 65/186; 65/393; 438/42; 438/43; 438/44

(58) Field of Classification Search ............ 385/132, 385/146; 65/393; 438/44
See application file for complete search history.

(56) References Cited

U.S. PATENT DOCUMENTS

| 4,375,312 A * | 3/1983 | Tangonan ............ 385/132 |
| 4,585,299 A * | 4/1986 | Strain ............... 385/132 |
| 4,778,234 A * | 10/1988 | Papuchon et al. ....... 385/132 |
| 4,810,049 A * | 3/1989 | Fischer et al. ........ 385/132 |
| 5,061,029 A * | 10/1991 | Ishikawa ............ 385/132 |
| 5,291,575 A * | 3/1994 | Yanagawa et al. ...... 385/132 |

(Continued)

OTHER PUBLICATIONS de Boer et al. "*Micromachining of Buried Micro Channels in Silicon*", Journal of Microelectromechanical Systems, vol. 9., No. 1, Mar. 2000, pp. 94-103.

(Continued)

*Primary Examiner*—Ryan Lepisto
(74) *Attorney, Agent, or Firm*—Mark M. Friedman

(57) ABSTRACT

Waveguide(s) (130) including at least partially buried channels) (120) within substrate(s) (100) having at least one substantially planar surface (110) are disclosed. According to some embodiments at least part of the channel (120) is located beneath at least a portion of the substrate (100). According to some embodiments the waveguide channel (120) includes a substantially transparent core (140) and optional cladding (160) extending through the channel (120). Alternately, an inner surface of the channel (120) is highly reflective. Furthermore, structures for use as waveguides (130) and/or as microchannels for fluid flow are disclosed herein. Also disclosed are production methods for such waveguides and said structures (130) and said structures, and methods of using such waveguides (130).

31 Claims, 17 Drawing Sheets

U.S. PATENT DOCUMENTS

| | | | |
|---|---|---|---|
| 5,297,218 A * | 3/1994 | Hanaoka | 385/52 |
| 5,432,881 A * | 7/1995 | Doi | 385/132 |
| 5,526,454 A | 6/1996 | Mayer | |
| 5,562,838 A * | 10/1996 | Wojnarowski et al. | 216/24 |
| 5,568,574 A | 10/1996 | Tanguay, Jr. et al. | |
| 5,586,209 A * | 12/1996 | Matsuura et al. | 385/45 |
| 5,719,073 A | 2/1998 | Shaw et al. | |
| 5,748,358 A * | 5/1998 | Sugamata et al. | 359/245 |
| 5,749,132 A * | 5/1998 | Mahapatra et al. | 29/25.35 |
| 5,987,196 A * | 11/1999 | Noble | 385/14 |
| 6,226,423 B1 * | 5/2001 | Minakata et al. | 385/2 |
| 6,356,692 B1 | 3/2002 | Ido et al. | |
| 6,399,182 B1 | 6/2002 | Rubel et al. | |
| 6,462,391 B1 | 10/2002 | Chong et al. | |
| 6,602,791 B2 | 8/2003 | Ouellet et al. | |
| 6,625,366 B2 | 9/2003 | Ruschin et al. | |
| 6,671,438 B2 | 12/2003 | Ido et al. | |
| 6,731,856 B1 | 5/2004 | Fujita et al. | |
| 6,741,469 B1 | 5/2004 | Monfarad | |
| 6,785,134 B2 | 8/2004 | Maveety et al. | |
| 6,903,929 B2 | 6/2005 | Prasher et al. | |
| 6,934,154 B2 | 8/2005 | Prasher et al. | |
| 7,068,870 B2 * | 6/2006 | Steinberg et al. | 385/14 |
| 2004/0028336 A1 * | 2/2004 | Feuer et al. | 385/50 |
| 2004/0033001 A1 * | 2/2004 | Nagata et al. | 385/2 |
| 2004/0061918 A1 * | 4/2004 | Pruneri et al. | 359/245 |

OTHER PUBLICATIONS

Book-Najafi-: *Introduction to Glass Integrated Optics* by S. I. Najafi, Artech House Publishers, 1992.

Hiroshi Yamada "*Correlation Between Excess Si Atoms near the Ultrathin Silicon Oxide-Si(100) Interface and Oxidation Temperature*," Journal of Electronic Materials, vol. 30, No. 8, 2001, pp. 1021-1027.

Fink et al "Guiding Optical Light in Air using an All- Dielectric Structure," Journal of Lightwave Technology, vol. 17, No. 11, Nov. 1999, pp. 2039-2041.

* cited by examiner

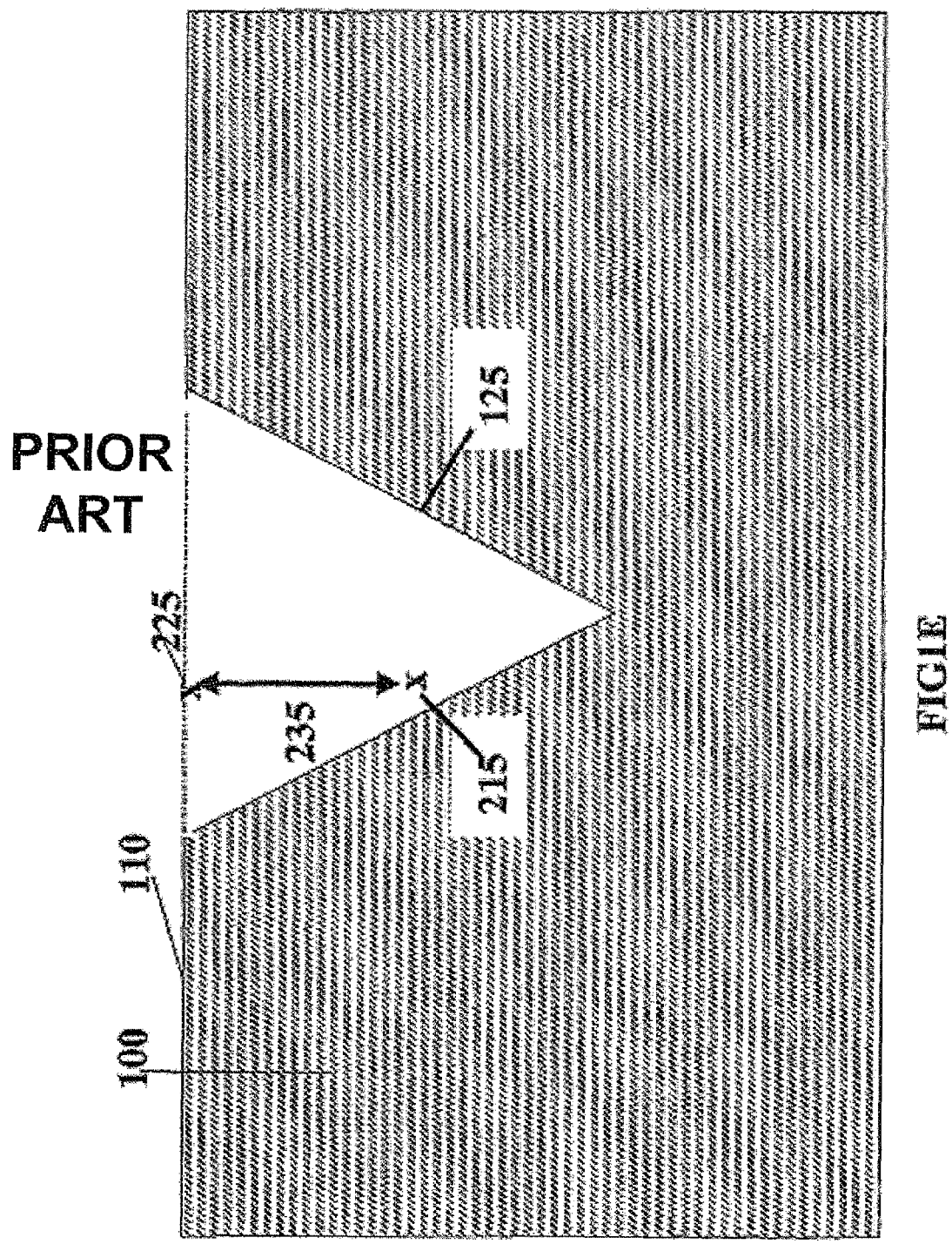

| | | |
|---|---|---|
| 1 | O₂ or +H₂O, T≈950-1100 °C<br>Si substrate | Making of a protection cover.<br>It possible to use SiO₂, or Si₃N₄ materials. Silicon dioxide can be made by dry or wet thermal oxidation of the Silicon substrate. Evaporation, sputtering, and growing of both SiO₂ and Si₃N₄ layers are possible for use, as well.<br>Protection layer thickness is typically 0.3-0.5μm |
| 2 | photoresist<br>Protection layer<br>Si substrate | Photolithography process.<br>Photoresist Shipley 1818 was used. Widths of the open windows (without photoresist) ranged from 2 to 10 μm. |
| 3 | Si substrate | Dry etching of the protection layer by RIE machine<br>For etching of the *SiO₂* we use "Nextral-800" RIE machine<br>Active gases are: CFH₃, O₂<br>Power is 200W<br>It possible to use isotropic wet etching by HF solution |

FIG. 2A

| | | |
|---|---|---|
| 4 | 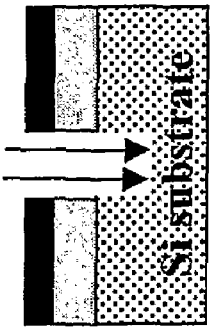 | *Dry anisotropic etching of the Silicon substrate* by ICP RIE machine.<br>Using gases are: $SF_6$, $C_4F_8$, $O_2$, Ar<br>RIE power is 50W<br>Bias power is 850W<br>Pressure is 23mBr |
| 5 | 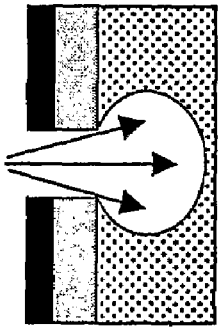 | *Dry isotropy etching of the Silicon substrate* by ICP RIE machine.<br>Using gases are: $SF_6$, $O_2$<br>RIE power is 35W<br>Pressure is 26mBr<br>It possible to use isotropic wet etching by HF solution |
| 6 | 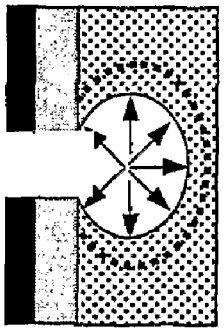 | Wet or dry *thermal oxidation*. Thickness of the $SiO_2$ buffer layer was obtained about 1μm after 30 hours dry oxidation at 1050 °C temperature and at 2.5 l/sec of $O_2$ gas flow. |

FIG. 2B

| | | |
|---|---|---|
| 1 | O₂ or +H₂O, T≈950-1100 °C [diagram: Si substrate] | Making of a protection cover. It possible to use SiO₂, or Si₃N₄ materials. Silicon dioxide can be made by dry or wet thermal oxidation of the Silicon substrate. Evaporation, sputtering, and growing of both SiO₂ and Si₃N₄ layers are possible for use, as well. Protection layer thickness is typically 0.3-0.5μm. |
| 2 | [diagram: photoresist on Protection layer on Si substrate] | Photolithography process. Photoresist Shipley 1818 was used. Widths of the open windows (without photoresist) ranged from 2 to 10 μm. |
| 3 | [diagram: Si substrate with etched protection layer] | Dry etching of the protection layer by RIE machine. For etching of the *SiO₂* we use "Nextral-800" RIE machine. Active gases are: CFH₃, O₂. Power is 200W. It possible to use isotropic wet etching by HF solution |

FIG. 3A

| | | |
|---|---|---|
| 4 | 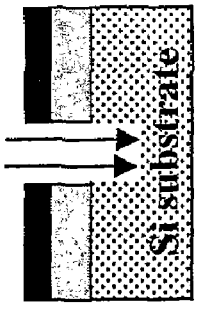 | *Deep dry anisotropic etching of the silicon substrate* by ICP RIE machine on 20-100 μm.<br>Used gases are: $SF_6$, $C_4F_8$, $O_2$, Ar<br>RIE power is 50W<br>Bias power is 850W<br>Pressure is 23mBr |
| 5 | 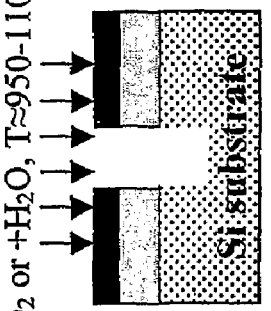 | *Making of a $SiO_2$ cover* by dry or wet thermal oxidation of the etched silicon substrate.<br>$SiO_2$ layer thickness is 0.3- 0.5 μm |
| 6 | 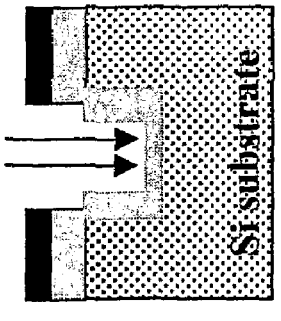 | *Anisotropic dry etching of the $SiO_2$ layer* by RIE machine ("Nextral-800").<br>Active gases are: $CFH_3$, $O_2$<br>Power is 200W<br>Goal- remove of the $SiO_2$ layer from bottom of the hole, but the layer must remain on the hole wells |

FIG. 3B

| | | |
|---|---|---|
| 7 | 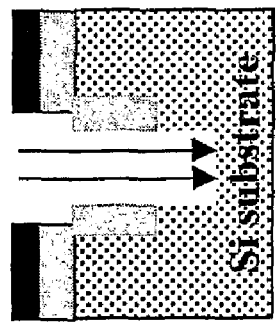 | *Dry anisotropy etching of the silicon substrate* by ICP RIE machine on 20-100 μm.<br>Using gases are: $SF_6$, $C_4F_8$, $O_2$, Ar<br>RIE power is 50W<br>Bias power is 850W<br>Pressure is 23mBr |
| 8 | 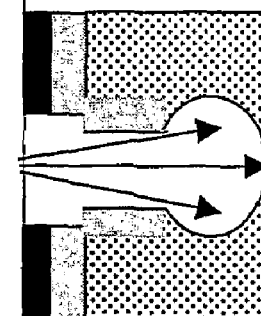 | *Dry isotropic etching of the silicon substrate* by ICP RIE machine.<br>Using gases are: $SF_6$, $O_2$<br>RIE power is 35W<br>Pressure is 26mBr |
| 9 | 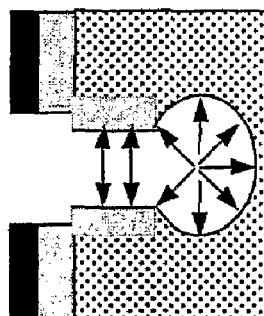 | *Dry thermal oxidation.* Thickness of the $SiO_2$ buffer layer was obtained about 1μm after 30 hours dry oxidation at 1050 $^0$C temperature and at 2.5 l/sec of $O_2$ gas flow. |

FIG. 3C

STEP 10

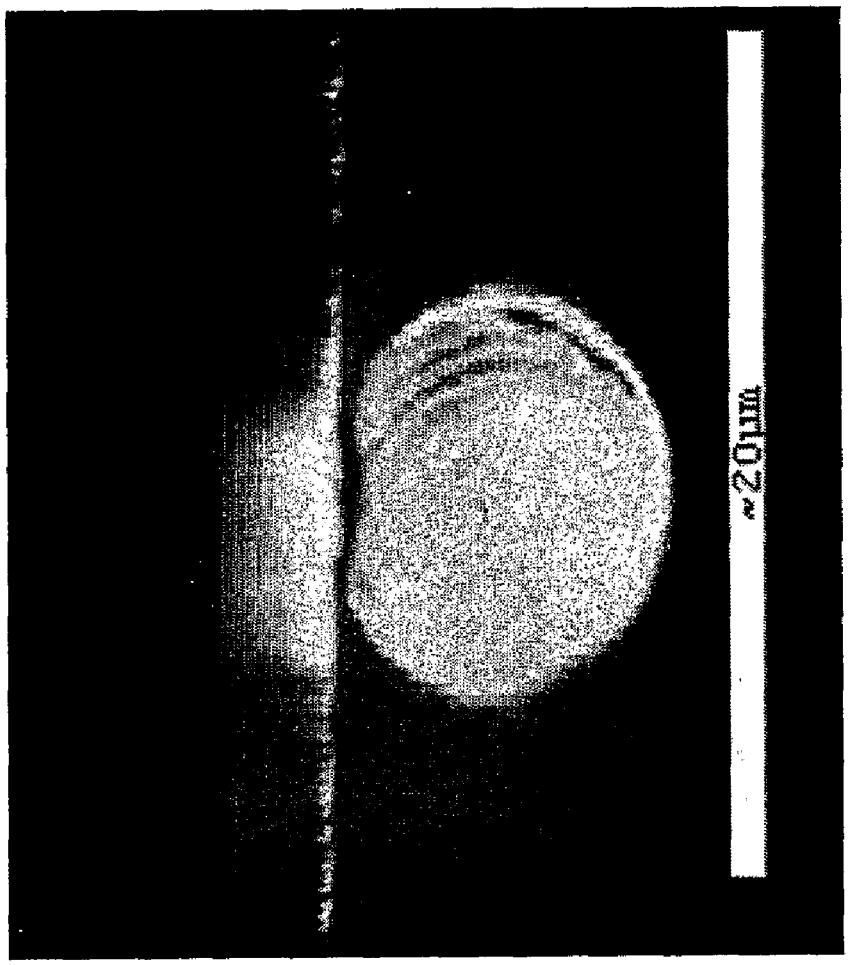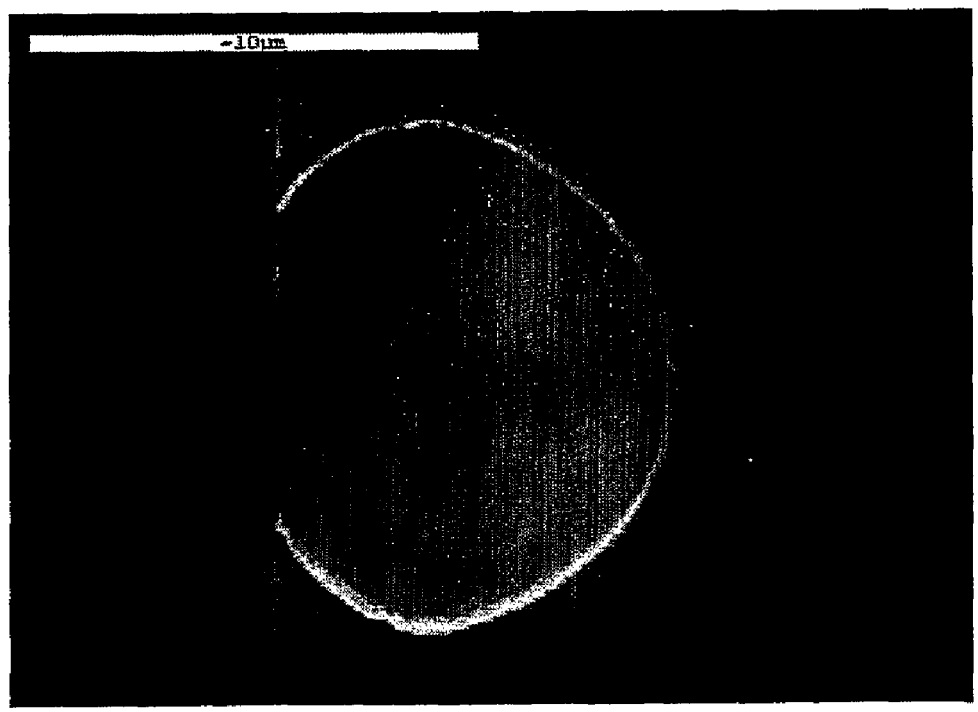
Figure 6C.

EMBEDDED CHANNELS, EMBEDDED WAVEGUIDES AND METHODS OF MANUFACTURING AND USING THE SAME

FIELD OF THE INVENTION

The present invention relates to embedded channels, embedded waveguides and to methods of manufacturing and use of the same.

BACKGROUND OF THE INVENTION

Waveguides

There is presently an increased interest in integrating in a single semiconductor device both electronic and optical-optoelectronic components. There are several motivations for that: First, the increasing speed demands from micro-electronic processors are being limited nowadays by the capacity of metallic interconnects in a Silicon chip. Optical buses inside the chip would alleviate such limitations. Optical waveguides have significantly larger bandwidth and data-rate capability, and they dissipate less power in form of heat as compared to metallic interconnects. In other applications, the aim of the device is to transmit or receive information to an optical carrier external to the device. In these cases, such a device will contain necessarily an electric-to-optic converting component (i.e. laser or LED) or vice versa optic-to-electric transducer (light detector). That scheme could much benefit from the existence of an efficient waveguide to interface between the transmitter or receiver and an external optical fiber. The two given examples, namely the case of interconnections inside the processor and transmission into an external fiber are in great extent extreme cases regarding the data communication range. There are also intermediate situations in that sense, for example interconnecting between different semiconductor processors or more general devices on a common board or rack. Another consideration in choosing a mean of interconnecting is the manufacturability of the process leading to the fabrication of such a via. Silicon microelectronic and micromachining technologies are highly developed, and the compatibility of the device with such a process is undoubtedly a great advantage. From all these considerations it is clear that it is very desirable to provide a waveguide having the properties of high data throughput, ease of interfacing with an optical fiber, use of low-cost materials, manufacturability and process simplicity. The invention disclosed here has apparently all these mentioned advantages. Another innovative point of the present disclosure is the description of waveguides that are aligned across the supporting wafer, i.e. connect the two opposite sides of the wafer ("vertical waveguides"). This configuration should be useful when one tries to connect both sides of a wafer or sending signals into the back-plane. There are also cases where the transmitter or detector looks in a direction perpendicular to the surface of the wafer.

Several published articles and patents have dealt with the problem of creating waveguides made by combining polymer and other materials on a silicon wafer. Most of previously disclosed material describes a waveguide consisting of a lower cladding layer, a core layer, and an upper cladding layer. U.S. Pat. No. 6,731,856, incorporated by reference in its entirety, describes a method of fabricating such a waveguide on a buffer layer and a core section made of organic polymer which are formed on a substrate. In U.S. Pat. No. 6,671,438, incorporated by reference in its entirety, such a waveguide is fabricated contiguously to etched V-groves to facilitate the position of optical fibers. U.S. Pat. No. 6,356,692, incorporated by reference in its entirety, recognizes the drawback of placing a waveguide on top of the wafer, and alleviates the problem by disclosing a method of thinning the lower clad, and thus reducing the overall height of the waveguide relative to the surface of the wafer. In U.S. Pat. No. 5,526,454, incorporated by reference in its entirety, silicon is used of fabricating a master structure in order to replicate a structure composed by a V-grove for fiber placement attached to a waveguide, the whole component being made out of polymer material.

In all these methods, the waveguide is fabricated on top of the substrate and are not embedded inside the semiconductor material. Regarding the embodiment of the present invention where waveguides are directed substantially perpendicularly to the surface of the wafer. No waveguides of the type described here could we find in the open literature but some previous art can be found regarding the handling of light emitted perpendicularly to the surface of the wafer by Light Emitting Diodes (LED's).

U.S. Pat. No. 5,568,574, incorporated by reference in its entirety, describes a method of transferring a light signal from one surface of the wafer to the opposite one. By the use of a diffraction grating, light is deflected from a horizontal or lateral direction of propagation into a vertical direction (within this document we define "horizontal" direction as parallel to the surface of the wafer or chip and "vertical" direction as normal to the said surface). While propagating through the material in the vertical direction the light will necessarily suffer from diffraction effects as dictated from the laws of optics when light propagates through a homogeneous medium. As a consequence of all these considerations, it is clear that there is need for a technology and method that enables the fabrication of optical waveguides inside the substrate material, both in the horizontal and vertical direction. These waveguides could conduct optical power and information both, beneath the surface of the wafer and across it. These waveguides are distinct from most of the conventional kinds found in literature, where the waveguides are fabricated at the surface itself either above or below them. One exception is the so-called "buried waveguides" fabricated by diffusion in dielectric transparent material by diffusion and further processing (Book-Najafi-: *Introduction to Glass Integrated Optics* by S. I. Najafi, Artech House Publishers, 1992). This process is not viable in Silicon.

It is noted that U.S. Pat. No. 6,625,366, incorporated by reference in its entirety, of one of the present inventors entitled "Polymer on substrate waveguide structure and corresponding production method" also discloses potentially relevant background material.

Embedded MicroChannels

There is an ongoing need for improved microchannels and improved methods of manufacturing microchannels. The following publications provide relevant background material and are all incorporated herein by reference: "Micromachining of Buried Micro Channels in Silicon" by de Boer et al., Journal of Microelectromechanical Systems, Vol. 9, No. 1, March 200, page 94; U.S. Pat. Nos. 6,462,391; 6,785,134; 6,934,154; 6,903,929; 6,741,469; 6,399,182; 6,602,791; and 5,719,073.

SUMMARY OF THE INVENTION

The aforementioned needs are satisfied by several aspects of the present invention.

It is now disclosed for the first time a waveguide comprising a substrate having a substantially planar surface, and an elongated at least partially buried channel, at least part of said channel being located beneath at least a portion of said substrate, wherein the channel is configured as a waveguide for electromagnetic radiation having a wavelength between about 200 nm and about 20.00 nm.

According to some embodiments, the device further comprises a core of a substantially solid material extending within said channel, said core substantially transparent to electromagnetic radiation having a wavelength between about 200 nm and about 20,000 nm.

According to some embodiments, said core includes at least one of amorphous solids, amorphous dielectrics, crystalline substances, crystalline dielectrics, glasses, transparent polymers, transparent dielectrics.

According to some embodiments, said core is substantially transparent to electromagnetic radiation selected from the group consisting of ultraviolet light, visible light, near infrared light, mid-wavelength infrared light, long-wavelength infrared light, and far wavelength infrared light having a wavelength less than about 20,000 nm.

According to some embodiments, the presently disclosed waveguide further comprises a cladding substantially surrounding said core, said cladding having a lower refractive index than a refractive index of said core.

According to some embodiments, said cladding is a portion of said substrate chemically modified, such as an oxidized portion of substrate. Alternatively or additionally, the cladding is introduced using passivation (deposition or covering).

According to some embodiments, said cladding includes at least one of amorphous solids, amorphous dielectrics, crystalline substances, crystalline dielectrics, glasses, transparent polymers, transparent dielectrics.

According to some embodiments, said cladding includes at least one of a material an oxide and a nitride.

According to some embodiments, said cladding includes at least one of SiO2, Si3N4, GaN, AlN, and AlGaN.

According to some embodiments, said cladding includes an oxide of said substrate.

According to some embodiments, a ratio between a refractive index of said core and a refractive index of said cladding is at most 1.1.

According to some embodiments, an outer surface of said cladding is molded to an inner surface of said channel.

According to some embodiments, a value of a width of said core is between about 5 microns and about 100 microns.

According to some embodiments, a value of a width of said core is between about 5 microns and about 100 microns.

According to some embodiments, a refractive index of said substantially transparent core is larger than a refractive index of silicon dioxide.

According to some embodiments, an outer surface of said core is molded to substrate of an inner surface of said channel.

According to some embodiments, said substrate is substantially transparent to electromagnetic radiation having a wavelength between about 200 nm and about 20,000 nm It is now disclosed for the first time a waveguide comprising a substrate having a substantially planar surface, an elongated at least partially buried channel, at least part of said channel being located beneath at least a portion of said substrate, wherein an inner surface of said at least partially buried channel is highly reflective.

According to some embodiments, said channel within said reflective inner surface is substantially hollow, or filled with material of refractive index lower than that of the substrate and materials comprising said reflective inner surface.

According to some embodiments, said inner surface of said channel is coated with a substantially highly reflective coating.

According to some embodiments, a ratio between a width of said channel and a thickness of said coating of said inner surface is at least about 5.

According to some embodiments, said coating includes at least one of a dielectric and a metal.

According to some embodiments, said coating includes a plurality of alternating layers of semiconductor or dielectric materials with a difference in refractive index.

According to some embodiments, said substrate selected from the group consisting of a semiconductor, a conductor, an insulator and a crystal.

According to some embodiments, a value of a width of said at least partially buried channel is between about 5 microns and about 250 microns.

According to some embodiments, at least 70% of the width of said channel is located beneath said substrate.

According to some embodiments, an elongate axis of said channel is substantially parallel to said surface.

According to some embodiments, said channel is substantially cylindrical.

According to some embodiments, the presently disclosed waveguide further comprises electrical circuitry embedded within or located near the surface of said substrate.

In some embodiments, "near the surface" is defined as within 1 micron in a direction substantially normal to the local surface. Alternatively, "near the surface" is defined as within 100 nanometers. Alternatively, "near the surface" is defined as within 10 nanometers.

According to some embodiments, the presently disclosed waveguide further comprises an electro-optical element for performing a function selected from the group consisting of converting an optical signal propagating within said core to an electrical signal accessible to said circuitry, and converting an electrical signal of said circuitry to an optical signal that propagates substantially through said core.

According to some embodiments herein said substrate is a semiconductor.

According to some embodiments said semiconductor is silicon.

According to some embodiments a center of a cross-section of said core is substantially located at a central location (e.g. a center) of a cross-section of said channel.

According to some embodiments a shape of a cross-section of said elongated at least partially buried channel is substantially invariant along translation along an elongate axis of said channel.

According to some embodiments, the dimensions of a cross-section of said elongated at least partially buried channel are substantially invariant along translation along an elongate axis of said channel.

According to some embodiments, a thickness of said substrate is between about 300 microns and 2000 microns.

According to some embodiments, wherein a ratio between a thickness of said substrate and a width of said elongated channel is at least about 6. Alternatively, this ratio is at least about 10. Alternatively, this ratio is at least about 30. Alternatively, this ratio is at least about 100. Alternatively, this ratio is at least about 10. Alternatively, this ratio is at least about 30. Alternatively, this ratio is at least about 100.

According to some embodiments, the presently disclosed waveguide further comprises an access channel or access slot traversing said substrate between said at least partially buried channel and said surface of said substrate.

According to some embodiments, a width of the access channel or access slot is less than a width of the at least partially buried channel. According to some embodiments, a width of the access channel or access slot is at most 70% a width of the at least partially buried channel.

According to some embodiments, said access channel or access slot is substantially sealed with a material other than said substrate.

According to some embodiments, said material is an oxide of said substrate.

According to some embodiments, said oxide is SiO2.

According to some embodiments, an inner surface of said access channel or access slot includes an oxide of said substrate.

It is noted that there is no explicit limitation on how the presently disclosed waveguide, or any of the presently disclosed waveguides, or any of the presently disclosed at least partially buried channels, are manufactured.

It is now disclosed for the first time a waveguide comprising a substrate having an upper surface and a lower surface, an elongated traversing channel between said upper and lower surface of said substrate, said channel traversing a thickness of said substrate, and a core of a substantially solid material of than a material of said substrate extending within said channel, wherein an outer surface of said core is molded to an inner surface of said channel.

It is now disclosed for the first time a waveguide comprising a substrate having an upper surface and a lower surface, an elongated traversing channel between said upper and lower surface of said substrate, said channel traversing a thickness of said substrate, a core of a substantially solid material extending within said channel, and a cladding substantially surrounding said core, said cladding having a refracting index that is less than a refractive index of said core, wherein said core and said cladding are substantially transparent to electromagnetic radiation having a wavelength between about 200 nm and about 20,000 nm, and wherein an outer surface of said cladding is molded to an inner surface of said channel.

It is now disclosed for the first time a waveguide comprising a substrate having an upper surface and a lower surface, an elongated traversing channel between said upper and lower surface of said substrate, said channel traversing a thickness of said substrate, a core of a substantially solid material extending within said channel, and a cladding substantially surrounding said core, said cladding having a refracting index that is less than a refractive index of said core, wherein said core and said cladding are substantially transparent to electromagnetic radiation having a wavelength between about 200 nm and about 20,000 nm, and wherein said cladding is a portion of said substrate chemically modified.

In some embodiments, said cladding having a refracting index that is less than a refractive index of said core.

In some embodiments, at least one of said core and said cladding are substantially transparent to electromagnetic radiation having a wavelength between about 200 nm and about 20,000 nm.

In some embodiments, a characteristic cross-section dimension of the channel (e.g. width) is substantially less than a characteristic horizontal dimension of the upper and/or lower surface.

According to some embodiments, said cladding is a structure resulting from modifying the substrate.

According to some embodiments, said cladding includes an oxide of said substrate.

According to some embodiments, the core and/or the cladding includes at least one of amorphous solids, amorphous dielectrics, crystalline substances, crystalline dielectrics, glasses, transparent polymers, transparent dielectrics.

According to some embodiments, at least one of said core and said cladding is substantially transparent to electromagnetic radiation selected from the group consisting of ultraviolet light, visible light, near infrared light, mid-wavelength infrared light, long-wavelength infrared light, and far wavelength infrared light having a wavelength less than about 20,000 nm.

According to some embodiments, a value of a width of said core is between about 5 microns and about 30 microns.

It is now disclosed for the first time a waveguide (e.g. such as a vertical waveguide) comprising a substrate having an upper surface and a lower surface and an elongated traversing channel between said upper and lower surface of said substrate, said channel traversing a thickness of said substrate, wherein an inner surface of said at least partially buried channel is coated with a substantially highly reflective coating.

According to some embodiments, at least one of said upper and said lower surface is substantially planar.

According to some embodiments, both said upper and lower surfaces are substantially planar.

According to some embodiments, a geometric profile (e.g. a shape and/or a size) of a cross-section of said channel varies along an elongation axis of said channel.

According to some embodiments, a shape of a cross-section of said channel is substantially invariant along translation along an elongate axis of said channel.

According to some embodiments, a width of said channel varies along an elongation axis of said channel.

According to some embodiments, a width of said channel is a substantially monotonically increasing or decreasing function of a position along an elongate axis of said channel.

According to some embodiments, a variation of a width of said channel along said elongation axis of said channel includes a periodic variation.

According to some embodiments, a ratio between an amplitude of said periodic variation and said width of said channel is at most 0.05.

According to some embodiments, a length of a period of said periodic variation is between about 0.1 microns and about 1 micron.

According to some embodiments, the waveguide is configured to have wavelength filtering properties. According to some embodiments, a shape of a cross-section of said channel is selected from the group consisting of substantially elliptical, substantially circular and substantially rectangular.

According to some embodiments, a value of a width of said channel is between about 20 microns and about 100 microns.

According to some embodiments, a thickness of said substrate is between about 300 microns and 2000 microns.

According to some embodiments, a ratio between a thickness of said substrate and a width of said elongated channel is at least about 6. Alternatively, this ratio is at least about 10. Alternatively, this ratio is at least about 30. Alternatively, this ratio is at least about 100.

According to some embodiments, an elongate axis of said channel is substantially perpendicular to at least one surface selected from the group consisting of said upper surface and said lower surface.

According to some embodiments, said substrate is selected from the group consisting of a semiconductor substrate, a conductor substrate and a crystalline substrate.

According to some embodiments, an inner surface of said elongated channel is corrugated.

According to some embodiments, said substrate is selected from the group consisting of a semiconductor substrate, a conductor substrate, an amorphous substrate, a dielectric amorphous substrate and a crystalline substrate.

It is now disclosed for the first time a structure (such as a microstructure) comprising a substrate of a first material having a substantially planar surface, an elongated channel embedded within said substrate below said surface, a filant of a second material other than said first material, said filant extending through and at least partially filling said elongated channel said fillant substantially transparent to electromagnetic radiation having a wavelength between about 200 nm and about 20,000 nm; and an internal channel buried within and extending through said filant, wherein for at least a majority of a width of said internal channel, at least a majority of a material above said majority of said width is said fillant.

According to some embodiments, a value of a width of said elongated channel is between about 20 microns and about 100 microns.

According to some embodiments, a value of a width of said internal channel is between about 5 microns and about 30 microns.

According to some embodiments, said second material is an oxide of said first material.

According to some embodiments, said first material is a semiconductor, and said second material is an oxidized semiconductor.

According to some embodiments, said first material is silicon, and said second material is silicon oxide.

According to some embodiments, said fillant is said substrate chemically modified.

According to some embodiments, said internal channel is configured as a waveguide.

According to some embodiments, the structure further comprises a core of a substantially solid material extending within said inner channel, said core substantially transparent to electromagnetic radiation having a wavelength between about 200 nm and about 20,000 nm.

According to some embodiments, said core has a refractive index that is more than a refractive index of said second material.

It is noted that the presently disclosed structure is useful in any relevant application, including but not limiting to as part of a waveguide and for fluid flow within the inner channel.

According to some embodiments, an elongate axis of said elongate channel or said inner channel is substantially parallel to said surface.

According to some embodiments, said inner channel is substantially cylindrical.

According to some embodiments, wherein a shape of a cross-section of said channel is substantially invariant along translation along an elongate axis of said channel.

According to some embodiments, the dimensions of a cross-section of said channel is substantially invariant along translation along an elongate axis of said channel.

According to some embodiments, a thickness of said substrate is between about 300 microns and 2000 microns.

According to some embodiments, a ratio between a thickness of said substrate and a width of said elongated channel is at least about 6. Alternatively, this ratio is at least about 10. Alternatively, this ratio is at least about 30. Alternatively, this ratio is at least about 100.

According to some embodiments, for a majority of a width of said internal channel, a material above said majority of said width, and below a plane of said substantially planar surface, is said fillant.

In some embodiments, said at least of a majority of material is a large majority (e.g. at least 70%), or an entirety of the material.

In some embodiments, said at least a majority of a width of said internal channel is a large majority (e.g. at least 70%) or an entirety.

It is now disclosed for the first time a method of transporting light through a substrate, the method comprising, providing a waveguide including a substrate, said substrate having a substantially planar surface, and an elongated at least partially buried channel, at least part of said channel being located beneath at least a portion of said substrate and introducing at one axial end of said elongate channel a beam of light such that said light propagates along said channel.

According to some embodiments, said provided waveguide includes a core extending through said at least partially buried channel, said core being substantially transparent to electromagnetic radiation having a wavelength between about 200 nm and about 20,000 nm.

According to some embodiments, an inner surface of said channel of said provided waveguide is coated with a substantially highly reflective coating.

According to some embodiments, said light is coherent light.

According to some embodiments, provided substrate includes electrical circuitry embedded within or located on said substrate, and the method further comprises detecting said light which has at least partially axially traversed said at least partially buried channel by said electrical circuit integral to said wafer.

It is now disclosed for the first time a method of manufacturing a waveguide, the method comprising providing a substrate having a substantially planar surface, forming an elongated at least partially buried channel, at least part of said channel being located beneath at least a portion of said substrate, and configuring said channel to function as a waveguide.

According to some embodiments, said configuring includes at least partially filling said substantially elongated channel with a core of a substantially solid material extending within said channel, and said core is substantially transparent to electromagnetic radiation having a wavelength between about 200 nm and about 20,000 nm.

According to some embodiments, said filling includes introducing a fluid into said at least partially buried channel and subjecting said liquid to a solidification process.

According to some embodiments, said fluid is introduced into said at least partially buried channel through an access channel or access slot traversing said substrate between said at least partially buried channel and said surface of said substrate.

According to some embodiments, said fluid is introduced through an axial end of said elongate channel.

According to some embodiments, said fluid is selected from the group consisting of a sol-gel filling and a liquid polymer. Examples include but are not limited to SU-8, PMMA, optical adhesives, and sol-gel glasses.

According to some embodiments, said configuring includes introducing a cladding substantially surrounding said core, said cladding having a lower refractive index than a refractive index of said core.

According to some embodiments, said introducing of said cladding includes chemically transforming substrate of an inner surface of said channel.

According to some embodiments, said chemical transformation includes oxidizing said substrate.

According to some embodiments, said substrate is a semiconductor.

According to some embodiments, said introducing of said cladding subjecting an inner surface of said channel to a deposition process.

According to some embodiments, said cladding includes a material selected from the group consisting of an oxide and a nitride.

According to some embodiments, said forming includes undercutting a portion of said substrate beneath said substantially planar surface.

According to some embodiments, said forming includes cutting a trench in said substrate; and subjecting a region within said trench to a substantially isotropic etching to undercut said portion of said substrate.

According to some embodiments, said cutting of said trench includes at least one of effecting a photolithography process and effecting an etching process.

According to some embodiments, said photolithography process includes placing photoresist material above said substrate, and a width of said channel is determined at least in part by a width of an open window of said photoresist material.

According to some embodiments, the method further comprises effecting a deposition of a protective layer above said substrate above said channel.

According to some embodiments, said configuring includes configuring an inner surface of said traversing or elongated partially buried channel to be highly reflective According to some embodiments, said channel having said highly reflective inner surface is substantially hollow.

According to some embodiments, n said configuring of said inner surface includes coating said inner surface with a highly reflecting coating.

According to some embodiments, said coating of said inner surface includes effecting a process selected from the group consisting of a deposition of a highly reflective coating on said inner surface of said channel.

According to some embodiments, said configuring includes subjecting said substrate of said inner surface to a chemical reaction, for example a chemical reaction to form a coating of the channel.

According to some embodiments, said chemical reaction is between said substrate of said inner surface and a fluid introduced into said channel.

According to some embodiments, said coating includes at least one of a dielectric and a metal.

According to some embodiments, said configuring includes introducing a material above said partially buried channel to seal said channel from above.

According to some embodiments, said introducing of said material includes subjecting said substrate above said channel to a chemical reaction, and channel is sealed with said reacted substrate.

According to some embodiments, said chemical reaction is an oxidation reaction.

According to some embodiments, said substrate is silicon.

According to some embodiments, said introducing of said material includes depositing said material above said channel.

It is now disclosed for the first time a method of manufacturing a sealed buried channel, the method comprising providing a substrate having a substantially planar surface, forming an elongated partially buried channel, at least part of said channel being located beneath at least a portion of said substrate, and subjecting said substrate above said partially buried channel to a chemical reaction to seal or bury said channel from above.

According to some embodiments, said chemical reaction is an oxidation reaction.

According to some embodiments, said substrate is a semiconductor.

According to some embodiments, said substrate is silicon.

According to some embodiments, a density of said reacted substrate is less than a density of said substrate.

According to some embodiments, at least part of said channel is located beneath at least a portion of said substrate.

According to some embodiments, at least part of said channel is located beneath at least a portion of said substrate before said subjecting to said chemical reaction.

According to some embodiments, the chemical reaction yields a substantially transparent material.

It is now disclosed for the first time method of manufacturing a waveguide, the method comprising providing a substrate having an upper surface and a lower surface, forming an elongated traversing channel between said upper and lower surface of said substrate, said channel traversing a thickness of said substrate, and configuring said formed channel to function as a waveguide.

According to some embodiments, the configuring includes introducing into said channel a core and cladding of substantially solid material, said core and said cladding being substantially transparent to electromagnetic radiation having a wavelength between about 200 nm and about 20,000 nm.

According to some embodiments, the configuring further includes introducing a cladding substantially surrounding said core, said cladding having a refractive index that is less than a refractive index of said core.

According to some embodiments, the introducing of said cladding includes chemically modifying said substrate.

According to some embodiments, said modifying said substrate includes oxidizing said substrate.

According to some embodiments, said forming of said channel includes effecting a photolithography process to specify a shape of said channel on said upper surface and etching said channel beneath said upper surface through said substrate.

According to some embodiments, said etching process is at least partially anisotropic.

According to some embodiments, said at least partially anisotropic etching process varies a width of said formed channel along an elongate axis.

According to some embodiments, a variation in said width is determined at least one part by at least one of lateral RF power, etch window, and a pressure in a chamber in which said channel is etched.

According to some embodiments, said forming of said channel includes iteratively etching a hole to enlarge a hole width, and effecting a deposition of an substantially rigid auxiliary material on an inner surface of said etched hole.

According to some embodiments, said substantially rigid auxiliary material is Teflon.

According to some embodiments, a width of said formed channel varies along an elongation axis of said channel.

According to some embodiments, a width of said channel is a substantially monotonically increasing or decreasing function of a position along an elongate axis of said channel.

According to some embodiments, a variation of a width of said channel along said elongation axis of said channel includes a periodic variation.

According to some embodiments, said forming of said channel includes iteratively etching a hole to enlarge a hole width, and deposition of an substantially rigid auxiliary material on an inner surface of said etched hole, and at least one of an amplitude of said periodic variation and a period distance of said periodic variation is determined at least in part by at least one of a strength of said etching process and a deposition thickness of said substantially rigid auxiliary material.

According to some embodiments, a ratio between an amplitude of said periodic variation and said width of said channel is at most 0.05.

According to some embodiments, a length of a period of said periodic variation is between about 0.1 microns and about 1 micron.

According to some embodiments, said configured waveguide is configured to have wavelength filtering properties.

According to some embodiments, a shape of a cross-section of said channel is selected from the group consisting of substantially elliptical, substantially circular and substantially rectangular.

According to some embodiments, a value of a width of said channel is between about 20 microns and about 100 microns.

According to some embodiments, a thickness of said substrate is between about 300 microns and 2000 microns.

According to some embodiments, a ratio between a thickness of said substrate and a width of said elongated channel is at least about 6. Alternatively, this ratio is at least about 10. Alternatively, this ratio is at least about 30. Alternatively, this ratio is at least about 100.

According to some embodiments, an elongate axis of said channel is substantially perpendicular to at least one surface selected from the group consisting of said upper surface and said lower surface.

It is now disclosed for the first time a method of manufacturing a structure (such as a microstructure), the method comprising providing a substrate having a substantially planar surface, forming an elongated at least partially buried channel below said planar surface, filling said channel with a second material other than said material, said fillant extending through and at least partially filling said elongated channel said fillant substantially transparent to electromagnetic radiation having a wavelength between about 200 nm and about 20,000 nm, and forming within said fillant an internal channel buried within and extending through said fillant such that for at least a majority of a width of said internal channel, a at least a majority of a material above said majority of said width is said fillant.

According to some embodiments, said filling of said channel includes subjecting said substrate to a chemical reaction to form said fillant.

According to some embodiments, said chemical reaction is an oxidation reaction.

According to some embodiments, a density of said fillant is less than a density of said substrate.

According to some embodiments, said substrate is a semiconductor

According to some embodiments, said semiconductor is silicon.

These and further embodiments will be apparent from the detailed description and examples that follow.

BRIEF DESCRIPTION OF THE DRAWINGS

FIG. 1E provides a cross-sectional image of a prior art partially buried channel.

FIGS. 2-3 provide descriptions of exemplary processes for forming a channel according to exemplary embodiments of the present invention.

DETAILED DESCRIPTION OF THE INVENTION

The present invention will now be described in terms of specific, example embodiments. It is to be understood that the invention is not limited to the example embodiments disclosed. It should also be understood that not every feature of the presently disclosed at least partially buried channels, waveguides within at least partially buried channels, and methods of manufacturing and using the same is necessary to implement the invention as claimed in any particular one of the appended claims. Various elements and features of devices are described to fully enable the invention. It should also be understood that throughout this disclosure, where a process or method is shown or described, some of the steps of the method may be performed in any order or simultaneously, unless it is clear from the context that one step depends on another being performed first.

Some embodiments of the present invention provide waveguides, or devices including channels configured as waveguides. As used herein, a "waveguide" is a device that substantially controls the propagation of an electromagnetic wave so that the wave is forced to substantially follow a path defined by the physical structure of the guide.

Figure 1A:
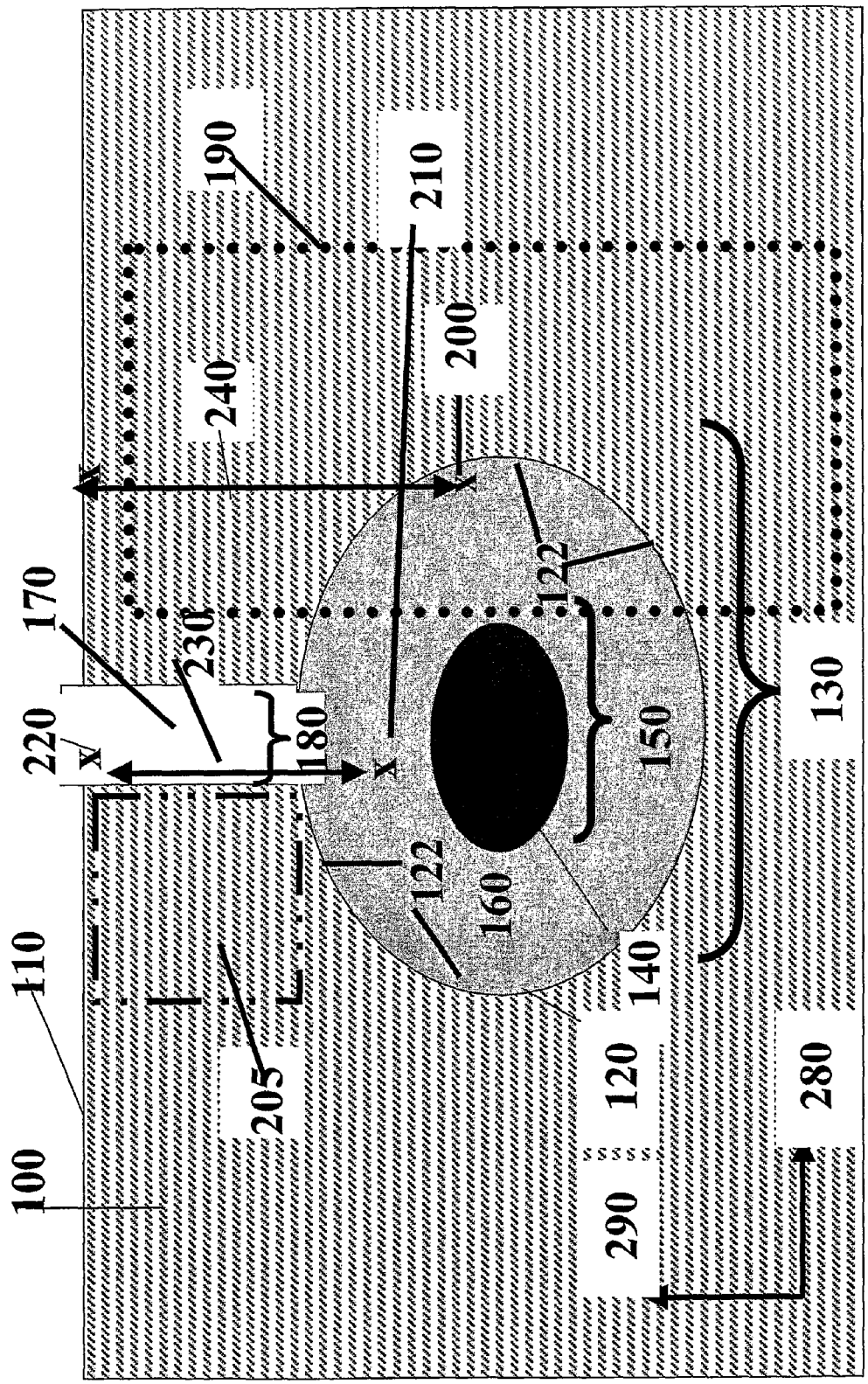
FIGS. 1A-1B provides a cross-sectional image of an exemplary partially buried elongated channel according to some embodiments of the embodiment.

FIG. 1A provides a cross-sectional image of an exemplary partially buried elongated channel 120 below the surface 110 of a substrate 100. It is noted that some embodiments of the present invention provide "elongated channels" or channels wherein a characteristic longitudinal dimension (e.g. a length of the channel) is substantially longer than a characteristic traverse dimension perpendicular to the longitudal dimension.

Thus, the channel 120 extends along an elongate axis (into and out of the page), and the length of the channel along the elongate axis is typically substantially longer than the characteristic dimensions of the channel 120. Thus, as shown in FIG. 1A, the "cross section" is delineated as the region within 120, and the "width" of the channel, e.g. the characteristic length within the plane of the cross-section (e.g. the plane defined by 280 and 290) in the direction parallel to the substantially planar surface 110 is denoted by 130. Thus, it is noted that for the specific case where the core and/or channel are substantially cylindrical, the "cross section" of the channel and/or core is circular, while the "width" of the channel and/or core is defined as the diameter of the circle.

It is noted that the channel has an "inner surface" 122.

We note that the "traverse channel plane" as depicted in FIG. 1A is the plane defined by lines 280 and 290, e.g. the plane perpendicular to the elongate axis of the channel into and out of the page.

Figure 1B:
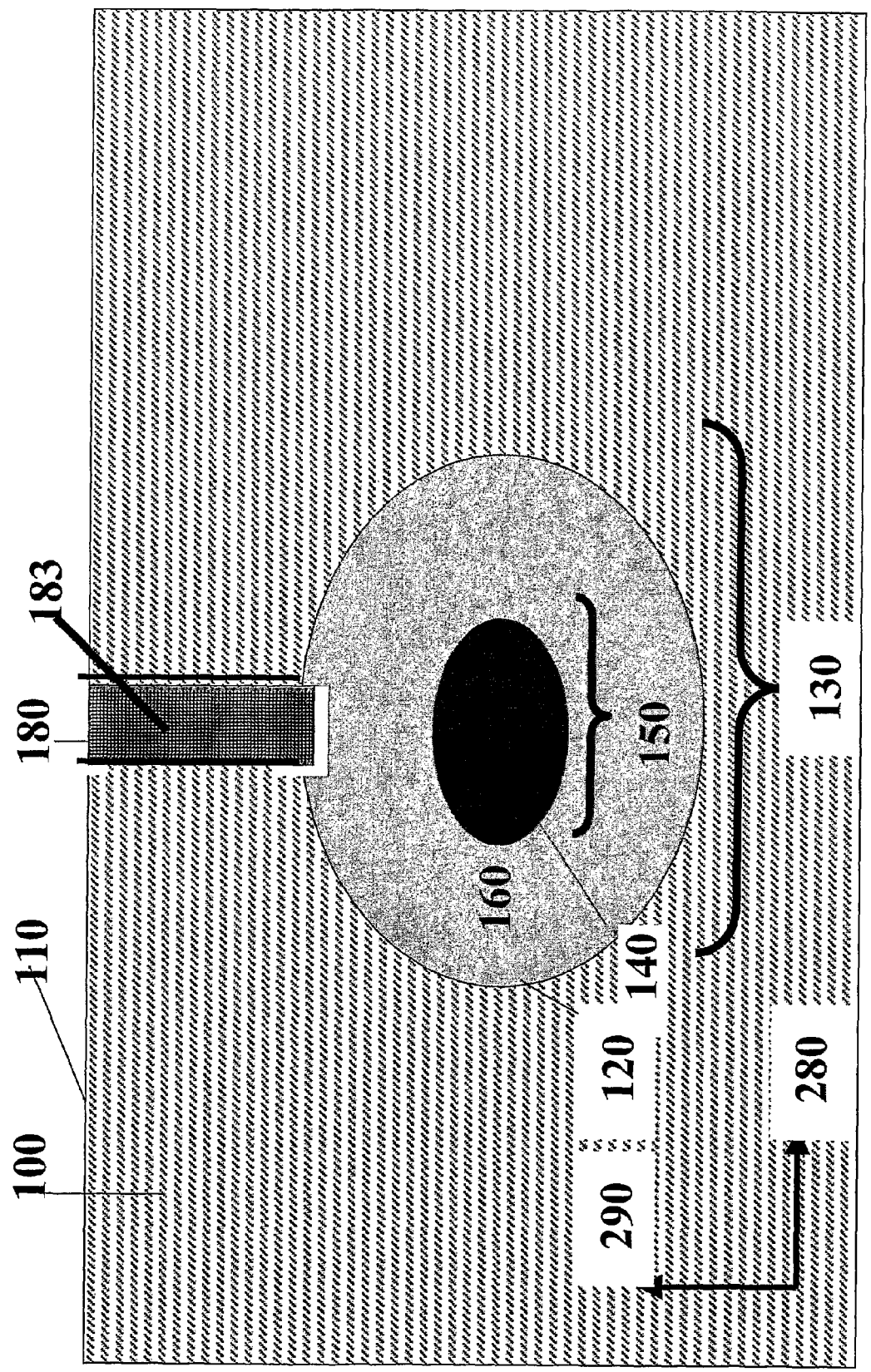
Figure 1C:
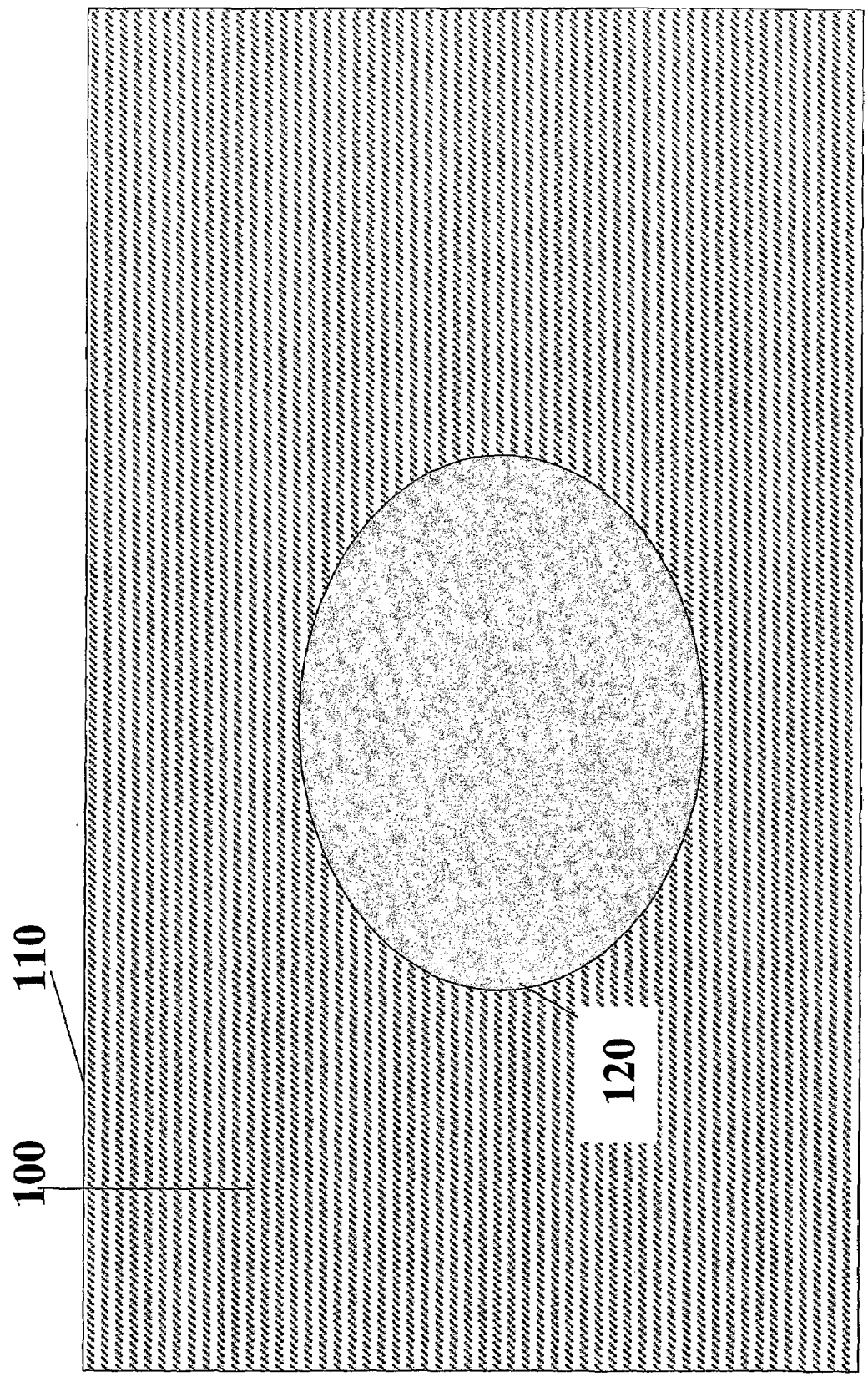
FIGS. 1C-1D provide reference figures.
Figure 1D:
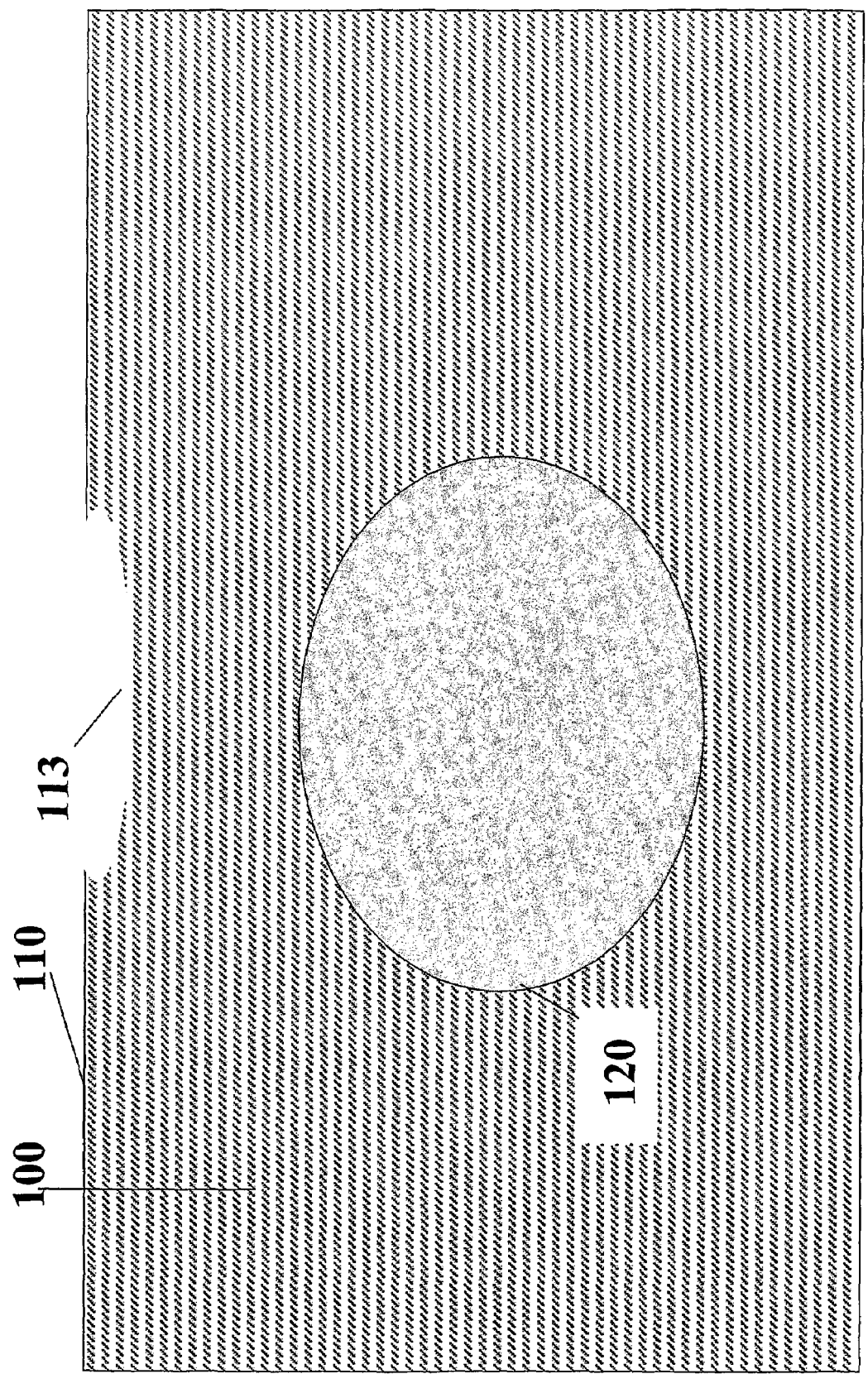

The channel 120 of FIGS. 1A-1B is "partially buried" within the substrate 100, where the concept of "buried" is defined throughout this disclosure in terms of the traverse channel plane. Thus, while FIGS. 1A-1B provide images of "partially buried" channels, FIGS. 1C-1D provide images of completely buried channels, as defined in the traverse channel plane. It is noted that for FIGS. 1C-1D, a portion of the channel may be exposed beyond the substrate at either end (for example, exposed at a plane perpendicular to the substantially planar surface 110), and the defined status of the channels of FIGS. 1C-1D as "completely buried" in the traverse channel plane remains FIGS. 1C and 1D are similar, though in FIG. 1D has a recess or indention 113 above the channel 120.

Furthermore, it is noted that even if the channel of FIG. 1A is sealed from above (see FIG. 1B), for example by deposition with a material 183, for example after channel formation, this does not negate the status of the channels FIG. 1B as a "partially buried channel within the substrate," since relative to the actual substrate, the channel 120 is only partially buried. Thus, for any material 183 added or deposited above the channel, including material that differs from a material of the substrate, and including material subsequently added or deposited that is substantially identical to a material of the substrate, the channel of FIG. 1B is considered partially buried.

According to some embodiments depicted in FIG. 1A, at least some of the at least partially buried channel is located "beneath" at least a portion of the substrate 100 with respect to an elongate axis of a channel. As illustrated in FIG. 1A, for a location, region or object to be "beneath" at least a portion of a substrate, every line in the traverse channel plane between the location, region or object and the surface of the substrate that is also perpendicular to the surface of the substrate must pass through at least a portion of the substrate. Thus, as illustrated in FIG. 1A, point 210 is not beneath at least a portion of the substrate, because line 230 within the traverse channel plane which connects point 210 to the surface 110, is perpendicular to the substrate surface 110, and intersects with the substrate surface at point 220 does not pass whatsoever through any substrate. Rather, line 230 passes through the at least partially buried channel 120 and through the access channel or access slot 170 (having an access channel or access slot width 180), both regions that are devoid of substrate.

In contrast, point 200, and all points within region 190, are defined as being "beneath" at least a portion of the substrate. For example, line 240 within the traverse channel plane and perpendicular to substrate surface 110 does pass through substrate.

Furthermore, it is noted that in some embodiments, regions of the channel that are "beneath" at least a portion of the substrate are formed by undercutting (e.g. by chemically undercutting by chemically removing or transforming substrate, or by mechanically undercutting) an "overhang region" (e.g. the region defined by 205) of the substrate.

Thus, channels located "beneath" at least a portion of the substrate are in contrast with channels formed by V or U shaped cuts (e.g. the V shaped cut of FIG. 1E), where no location in the V-shaped elongated channel 125 is "beneath" at least a portion of the substrate. For example, a line 235 connecting point 215 to the substrate surface 110 and also perpendicular to substrate surface 110 intersects the surface at point 225 and does not pass through any substrate.

Returning to FIG. 1A, it is noted that in some embodiments, within the channel 120 is an optional co-axial core 140 having a core width 150. According to some embodiments, the core 140 is optionally surrounded by a coating or cladding 160.

It is noted that the particular shape and area of the area of the channel 120 and area occupied by the core 140 depicted in FIG. 1A is brought as an example, and should not be construed as limiting. Furthermore, it is noted that in some embodiments, the exemplary area and/or shape delineated by the channel 120 and/or delineated by the borders of the core 160 is substantially invariant under translation along the elongate axis (in and out of the page). Alternatively, the area and/or shape delineated by the channel 120 or the borders of the core 160 varies as a function of location along the elongate axis.

According to some embodiments, the core is substantially immobilized within the channel. According to some embodiments, the channel 120 is substantially impermeable to fluids and/or gases.

According to some embodiments, a core and/or cladding of a "substantially solid material" includes amorphous solids as well as highly viscous fluids (e.g. glass) that are substantially immobilized. According to some embodiments, the core and/or cladding is an amorphous solid. According to some embodiments, the core and/or cladding is crystalline (e.g. has a crystal structure).

Some embodiments of the present invention provide two adjacent materials where a surface of one material is "molded to" the surface of another material, for example, by effecting a deposition of one material on the other material, or by providing the first material as a liquid which solidifies on the second material.

Some embodiments of the present invention provide an extended channel at least partially embedded within a substrate, with one or more materials that are an "integral part" of the substrate and that are within the channel, adjacent to the channel or adjacent to a surface of the substrate. As used herein, a material that is an "integral part" of the substrate is a "structure resulting from modifying the substrate." Thus, in some embodiments, material that is an "integral part" of the substrate is chemically modified substrate. This is in contrast to, for example, material that is deposited on a surface of the substrate and is not a product of chemically modifying the original substrate.

In one particular example, an oxide is formed from a semiconductor (e.g. silicon) substrate wafer, and the oxide is considered to be an integral part of the substrate, e.g. a structure resulting from modifying the substrate. Not wishing to be bound by any particular theory, in some embodiments an oxide of a semiconductor substrate that is an "integral part" of the substrate or is a "structure resulting from modifying the substrate" has excess semiconductor atoms (e.g. Si atoms) relative to the stoichiometric oxide composition (e.g. the stoichiometric SiO2 composition) near the oxide film-semiconductor substrate interface (see "Correlation Between Excess Si Atoms near the Ultrathin Silicon Oxide-Si(100) Interface and Oxidation Temperature," by Hiroshi Yamada, Journal of Electronic Materials, Vol 30, No. 8, 2001, page 1021, incorporated herein by reference in its entirety), though this is brought as possible evidence of an oxidized substrate as a structure resulting from modifying the substrate, and is not a requirement that the oxidized substrate indeed by an "integral" part of the substrate or a structure resulting from modifying the substrate.

According to some embodiments, a "target material" (e.g. core of a waveguide, cladding of a waveguide, fillant in a channel) is "substantially transparent" to light having one or more ranges of wavelengths between 200 nm to 20,000 nm. As used herein, a material that is "substantially transparent" for a given wavelength of light has an absorption coefficient of at most about a given threshold. In different embodiments, this threshold is about 3 $cm^{-1}$ or about 0.5 $cm^{-1}$ or about 0.05 $cm^{-1}$ or about 0.005 $cm^{-1}$.

According to some embodiments, the particular target material (e.g. core of a waveguide, cladding of a waveguide, fillant in a channel, or the substrate) is substantially transparent to one or more sub-ranges within the 200 nm to 20,000 nm range. It is recognized that there are a plethora of applications using waveguides as well as channels at least partially filled with a substantially transparent material, and that the skilled practitioner can select the appropriate material that is substantially transparent in the appropriate light frequency range.

Thus, in some embodiments, the target material is substantially transparent to visible light, e.g. light having a wavelength from about 400 nm to about 750 nm. In some embodiments, the target material is substantially transparent to infrared light, e.g. light having a wavelength from about 750 nm to about 20,000 nm. In some embodiments, the target material is substantially transparent to near infrared light, e.g. light having a wavelength from about 750 nm to about 1,400 nm. In some embodiments, the target material is substantially transparent to short wavelength infrared light, e.g. light having a wavelength from about 1,400 nm to about 3,000 nm. In some embodiments, the target material is substantially transparent to mid-wavelength infrared light, e.g. light having a wavelength from about 3,000 nm to about 8,000 nm. In some embodiments, the target material is substantially transparent to long-wavelength infrared light, e.g. light having a wavelength from about 8,000 nm to about 15,000 nm. In some embodiments, the target material is substantially to far wavelength infrared light having a wavelength of more than 15,000 nm.

Furthermore, it is noted that for some applications, target materials are substantially transparent to frequency bands of interest to telecommunications, e.g. to O-band length (wavelength from about 1260-1360 nm), E-band length (wavelength from about 1360-1460 nm), S-band length (wavelength from about 1460-1530 nm), C-band length (wavelength from about 1530-1565 nm), L-band length (wavelength from about 1565-1625 nm), U-band length (wavelength from about 1625-1675 nm).

According to some embodiments, the target material is substantially transparent to ultra-violet light having a wavelength from about 200 nm to about 400 nm.

It is noted that there is no specific limitation on the type material used for the core and for the cladding as long as the core and/or cladding interacts appropriately with electromagnetic radiation for a desired waveguide application, e.g. appropriate transparency to desired wavelengths of light, appropriate index of refractions, etc. Furthermore, it is noted in different embodiments, that any material specified herein for the core, or any material characteristic specified herein for the core (e.g. transparency to certain wavelengths of light, index of refractions, conductivity, etc.) is also appropriate for the cladding.

Typical materials for the core and/or cladding include but are not limited to amorphous solids, a crystalline substances, glasses, substantially transparent polymers, and substantially transparent dielectrics. It is observed that some of these aforementioned materials are at most moderate electrical and/or thermal conductors, or substantially poor electrical and/or thermal conductors, though this is by no means a limitation of the present invention.

Thus, in some embodiments, the core and/or cladding is a moderate electrical conductor. In some embodiments, the core and/or cladding is substantially poor electrical conductor.

Some embodiments of the present invention provide at least partially buried channels with a "highly reflective" coating on an inner surface of the at least partially buried channel.

According to some embodiments, an area of a surface coated with the "highly reflective" coating provides at least about 85% reflectivity. In some embodiments, an area of a surface coated with the "highly reflective" coating provides at least about 95% reflectivity.

There is no specific limitation on the material composition of the "highly reflective" coating. In some embodiments, the highly reflective coating includes a plurality of semiconductor and/or dielectric layers, e.g. alternating layers of semiconductor or dielectric materials with a difference in refractive index. Exemplary materials appropriate for the highly reflective coating include but are not limited to GaAsInP/In, ZnSe/MgF, and Si/SiO2. In some embodiments, the highly reflective coating includes a reflective metal such as silver or aluminum.

Furthermore, it is recognized that the "highly reflective" coating can exhibit reflective properties for a specific spectrum of electromagnetic radiation. Thus, in some embodiments, the highly reflective coating is highly reflective for at least one of ultraviolet light, visible light, near infrared light, mid-wavelength infrared light, long-wavelength infrared light, and far wavelength infrared light having a wavelength less than about 20,000 nm. The skilled practitioner is able to select the appropriate highly reflective coating for the relevant waveguide application.

According to some embodiments, waveguides that are fabricated inside the substrate material and propagate light both in the vertical and horizontal direction are presently disclosed. The method can be extended actually also to oblique directions of propagation. The method is specially suited to Silicon substrate material, but could be applied to other semiconductors as well. It can be extended also to substrates made out of metals and insulators.

According to some embodiments, a presently disclosed method for manufacturing a waveguide includes the following steps:
  a. The fabrication of tube-like holes inside the substrate material in predetermined direction, preferably by etching techniques common to micro-fabrication.
  b. The oxidation or passivation (deposition, covering) (for example: growth of the $SiO_2$, or $Si_3N_4$ from gaseous phase by mean of PCVD, LPCVD, etc. (it is very important for III-V-semiconductors group, or for Nitrides, for example: GaN, AlN, AlGaN, etc.)) of the inside walls of the holes.
  c. The filling of the holes by some transparent material having an index of refraction higher than the said oxide (any deposition buffer layer). According to some embodiments, the filling material has preferably the right viscosity and other curing properties as to penetrate efficiently into the holes, and create a stable duct. Possible filling materials include but are not limited to polymers or sol-gel glasses.

It is noted that some embodiments of the present invention recite configuring an inner surface of at least partially buried channel to be highly reflective. In particular, some embodiments of the present invention relate to coating an inner surface of an at least partially buried channel. There is explicit no limitation on how this coating is carried out, and in exemplary embodiments, the coating includes effecting a deposition process and/or introducing liquid into the channel and subjecting an inner surface of the channel to a chemical reaction. In some exemplary embodiments, techniques such as those disclosed in "Guiding Optical Light in Air using an All-Dielectric Structure," of Fink et al. Journal of Lightwave Technology, Vol. 17, No. 11, November 1999, page 2039, incorporated herein by reference, are used.

The following examples are to be considered merely as illustrative and non-limiting in nature. It will be apparent to one skilled in the art to which the present invention pertains that many modifications, permutations, and variations may be made without departing from the scope of the invention.

EXAMPLE 1

Horizontal or Lateral Waveguides

FIG. 2 describes and depicts an exemplary process for the creation of horizontal tubular waveguides embedded in silicon, though it is stressed that the waveguides and channels disclosed herein may be manufactured using processes other than those of FIG.

As seen, the first step here is the creation of a protective layer, in our case the layer was silicon dioxide, but silicon nitride may be even better. The method preferred here was the placing of the silicon wafer in a furnace within an ambient containing Oxygen and water (We used only dry oxidation—only O2 gas (0.99%), but wet oxidation method (with water vapor) is applicable, as well.) at partial pressures of a few hundred milliTorr (100÷300 mTorr) and temperature of 1050° C. for a few hours (3-8 hours). Next, openings are created by standard photolithography process in a photo-resist layer. Next, two dry-etching processes are described: one of them is to etch the Silicon Dioxide layer and the second (step 4), to continue to dry etch anisotropically silicon material. Step 5 is isotropic etching of the silicon to create a rather circular tubular profile for the at least partially buried channel. Step 5 consists of thermal oxidation of the inner part of the hollow cavity by special oxidation process: Oxygen flow (2.51/s), 10500C temperature, and 100 mTorr additional pressure to normal atmospheric pressure, the process creates about one micron oxide width in all directions of the etched hole after 30-hours oxidation. Instead of the oxidation process, silicon dioxide, or silicon nitride, or any transparent materials (for example epoxy, polymers, etc.) can be deposited on the whole walls of the etched holes in the Step 5, as well.

Relation between width, deep, and curvature of the holes can be achieved by searching of an optimal technical process, namely: width of the etched windows in photolithography process 1, depth of the etching in step 4, proportion between gases flow, pressure and RF power in step 5 of Tab. 1. We remind that thermal oxidation rates in silicon are anisotropic, meaning that they depended on the crystallographic direction of the oxidation. Nevertheless, quite uniform and isotropic layers of oxide were obtained matching of pressure, gas flow and temperature in chamber. Perhaps the most influential parameter in determining the geometry of the tubular cavities is the initial size of the opening in photo-resist. This determines the diameter of the tubular cavity. In our trials we found that there is dependence of the etch depth on the open window size. In the most preferred implementations of this embodiment of the present invention, the above steps result in an undercut structure where the bulk silicon wafer overhangs at least part of the tubular cavity.

The final step, not shown in FIG. 2 is the filling of the tubular cavities after oxidation by a polymer or another suitable filling material. Examples of polymers with the desired optical properties are SU-8 (photoresist material produced by the MicroChem Corp., Newton, Mass., USA), PMA or an optical adhesive. Other materials relevant for filling are sol-gel type of glasses. The material was dripped on the wafer's surface and spinned. (The spinned rate depends on the material viscosity, for example: we applied 6000 RPM during 2 minutes for filling of the holes by optical adhesive Norland 63). For higher viscosity polymers an additional step of 30 minutes in ultrasound chamber can be applied. A curing or polymerization step followed the described filling process. A final and optional step could be the deposition of an additional layer of oxide by either e-gun or sputtering deposition. This step is useful for protection of the polymer-based waveguides from dirt, humidity, and moreover it would possibly reduce the transmission losses of the optical waveguide.

EXAMPLE 2

Deep Buried Horizontal Closed Round Hollow Channels in Silicon (Tubes)

The following describes an extension of the process detailed above and its purpose is making of a spherical cross-section buried closed and long hollow tubes. The tube scan be applied for fabrication of the optical waveguides, thermo-stabilization, or cooling micro system, micro chemical laboratory (micro-mixer), etc.

FIG. 3 shows schematically the process.

As seen in FIG. 3, steps 1-4 are identical to process A described above in Example 1, except that in the last step (4) one aims to reach deeper depths according to the specific application in mind. In the steps following, a further oxidation process takes place following an isotropic etching step aiming to etch the bottom oxide layer of the generated hole. Step 8 is an isotropic etch of the silicon bulk material, and the two last steps are dry and wet oxidations with the purpose of conditioning the tube's wall and sealing the tube.

Figure 3D:
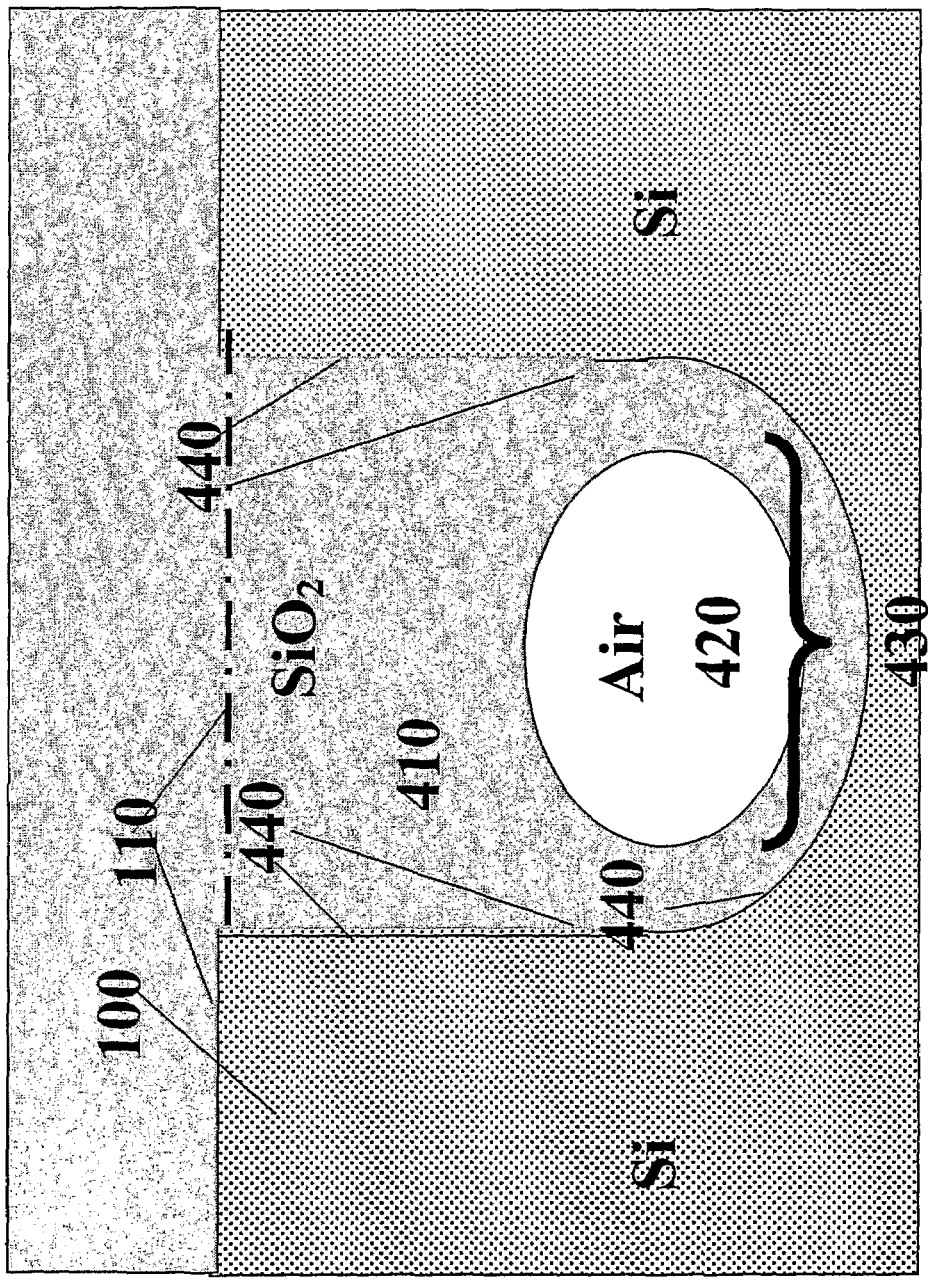

Step 10 is shown in FIG. 3D. Step 10 is wet thermal oxidation. Thickness of the SiO2 buffer layer has to have few microns for full closing of the etched channel. The figure shows result of the Step 9. Because size of silicon dioxide lattice is largest then silicon one, oxidized silicon has largest volume then original silicon layer on about 30%. Thus, if original etched window had two-micron width, after oxidization of the silicon on 3 microns the hole will be full closed by the silicon dioxide. The method is very useful for manufacturing of cooling microsystems Referring to FIG. 3D, it is noted that SiO2 is only one exemplary fillant 410 for at least partially filling the elongated channel 440 embedded within the substrate 100 below the substrate 110. In some embodiments, materials substantially transparent to electromagnetic radiation having a wavelength between about 200 nm and about 20,000 nm other than SiO2 at least partially fill the elongated channel 440.

Furthermore, it is noted that as illustrated in FIG. 3D, the internal channel 420, having a width 430, buried within the fillant is filled with air, though this for this particular example, and is not intended as a limitation of the present invention.

It is noted that as illustrated in FIG. 3D, for a majority of a width 430 of said internal channel, a majority of a material above said majority of said width (and below a plane 110 of the surface) is the fillant.

It is noted that the term fillant, as used herein, implies that structurally the final result is that the material referred to as "fillant" at least partially "fills" the channel, and does not imply any particular process by which external material is introduced or generated. In some embodiment, fillant may be generated in situ, for example, by chemically modifying (e.g. oxidation) the substrate.

In some embodiments where the fillant is substantially transparent to light at a given wavelength, this allows for observation of events occurring within the inner channel, for example, events occurring in a microfluid located within the microchannel.

EXAMPLE 3

Vertical Tubular Waveguides in Silicon

Figure 4:
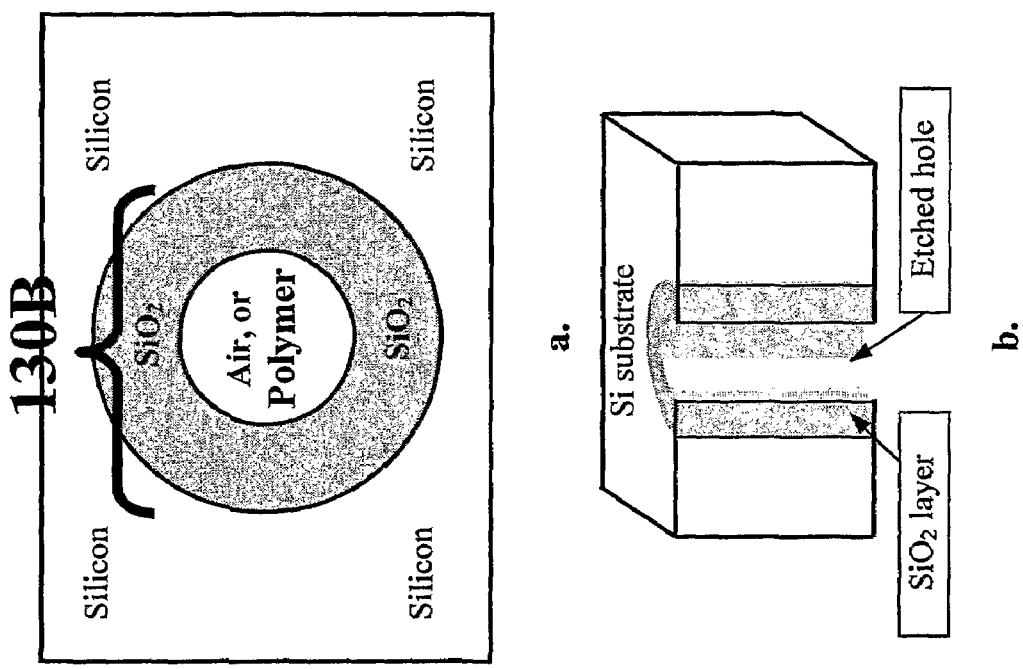
FIG. 4 provides an image of exemplary vertical etched holes according to plane and cross section views according to some embodiments of the present invention.

The idea here is to present a method for directing light from one side of a silicon wafer to the opposite one. Silicon material is opaque for light having wavelength smaller than 1.1 mm. For light of longer wavelength silicon is transparent and possesses a rather high refractive index (n~3.5). The method presented here is able to function for light both smaller and larger than 1.1 mm. Its transparency depends only on the transparency of the materials comprising the waveguides. The principle and method are similar to those described in the preceding sections. FIG. 4 shows the etched holes in plane and cross-section views. The hole (or traverse channel) of FIG. 4 has a width 130B.

The fabrication includes the steps:

1. Photolithography;
2. Etching of the silicon by dry anisotropic method (ICP-IRE technology);
3. Dry or wet oxidization of the etched channel.

For rather thick wafers like those customarily used in semiconductor device fabrication a special method needs to be adopted. This is due to the fact that the ICP dry etching method is not entirely isotropic. It etches preferentially along the depth direction, but part of the RF power is also applied in the lateral direction. As a consequence the diameter of an etched vertical hole will be enlarged at some extent as the hole deepens. Furthermore, for the same reason, the diameter close to the opening will be somewhat larger than the diameter at the bottom, and there is opposite condition, namely: diameter of the holes at the bottom sample's side is larger then upper one, for that reason, a conical shape of the holes can be obtained. Typically the angle of the cone is a few degrees for IRE dry etch procedure. If a non-tapered vertical tubular hole (cross-section substantially invariant with depth), used ICP-IRE machine in two steps etch method. First step is the etching of silicon and the second step is the deposition of Teflon on etched silicon walls. After the second step, the first step is repeated for removing of the Teflon mainly from the bottom of the etched holes (less from the side-walls) after the Teflon is removed, the etching of silicon continues. The two processes are repeated as necessary. Good verticality of the etched walls can be achieved by matching between parameters of both steps, namely: thickness of the Teflon deposition, time of the etch step, pressure, and vertical and lateral RF power.

We observed (see photograph) that the periodicity of the process described above reflects in a slight periodic change in the diameter of the holed generated. This corrugation is smoothened in some extent after oxidation. Periodicity in the diameter of waveguides may be useful since this feature causes the waveguide to have wavelength filtering properties (enables manufacturing of a cylindrical Bragg's grating). The period of the roughness can be controlled by matching of the time, and amplitude of the two steps mentioned above, namely Teflon depositions thickness and etching process strength. Basically both the period of the corrugations and their depth can be controlled.

EXAMPLE 4

Conical Tubular Waveguides in Silicon

As seen in Example 3, vertical holes (or traverse channels) etched by ICP process tend to be of conical shape. Conical etch angle depends on the correlation between lateral and vertical RF powers, etch window, and pressure in chamber. Thus, we can change the etch angle by mean of parameters variations, and therefore, we can obtain a variety cone-shaped vertical holes. These holes can be converted into waveguides by the same processes we mentioned for the other types described, namely walls oxidation and filling with transparent material like a suitable polymer.

Figure 5:
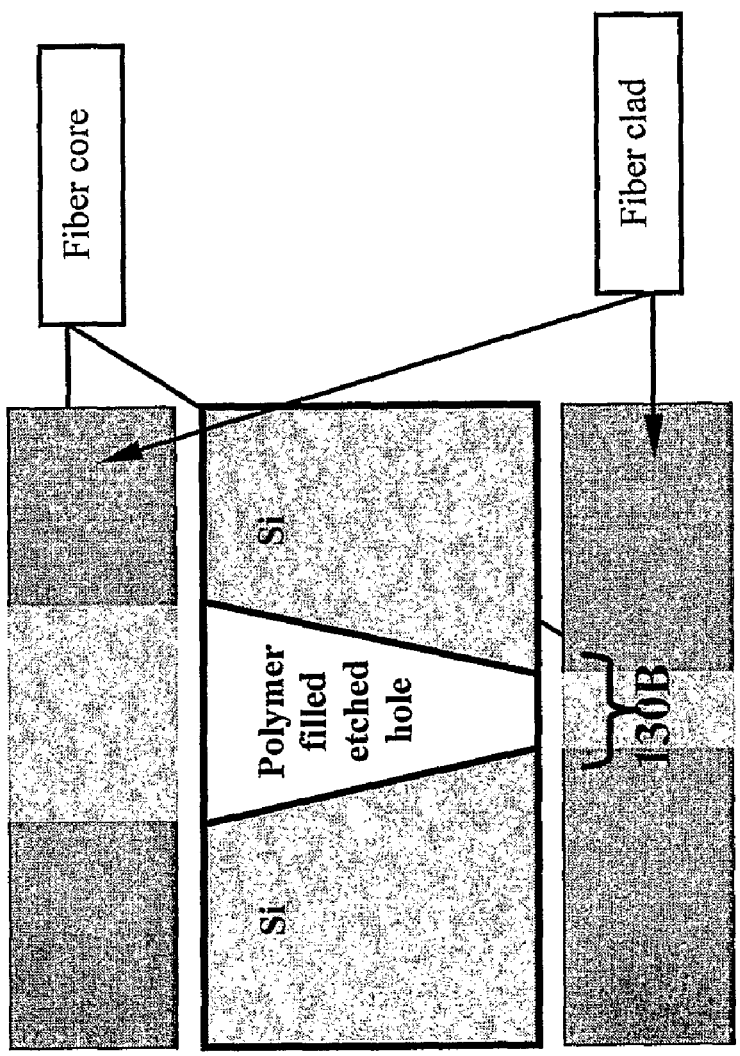
FIG. 5 provides an image of exemplary waveguide matching between two fibers with different core sized using a vertical cone-shaped waveguide according to some embodiments of the present invention.

The cone-shaped vertical holes may have several applications: interconnection between fibers with different core diameter (See FIG. 5), micro-lens, illuminated array, interferometric devices, imaging array, etc. As shown in FIG. 5, the vertical hole or traverse channel has a width 130B which varies as a function of position along the elongate axis (from top to bottom in the case of FIG. 5).

EXAMPLE 5

Additional Waveguide Shapes

For many optical applications a round shape for the waveguides is preferable, since that is the shape of modes is optical fibers, with which these waveguides could eventually interconnect. Mode matching both in size and shape is advantageous since it allows efficient power transmission between the guide and fiber. Most common optical elements (e.g. lenses) have cylindrical symmetry and handle best round-shaped optical beams. Other cross sections like oval or elliptical are possible to fabricate by the methods described above, since they can be achieved by suitable combinations of isotropic and anisotropic etching. Such cross-sections may be of use in cases where sources are involved that generate non-symmetric beams. One very common source with that property is a semiconductor laser, which emits near-elliptical shaped beams. In interconnect applications where the source and detector are on the same slab or board and no optical fibers are involved, oval-shaped beams would be a good choice.

EXAMPLE 6

SEM Images of Manufactured Channels

Figure 6B:
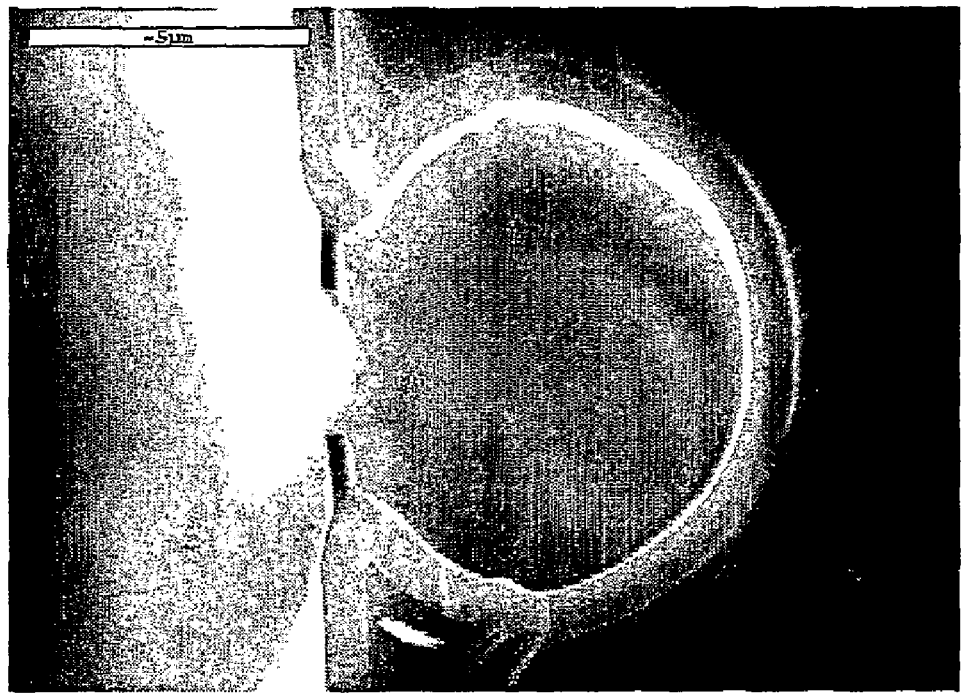
FIG. 6 provides images of SEM photographs of tubular waveguides embedded in semiconductor.
Figure 6A:
Figure 6D:
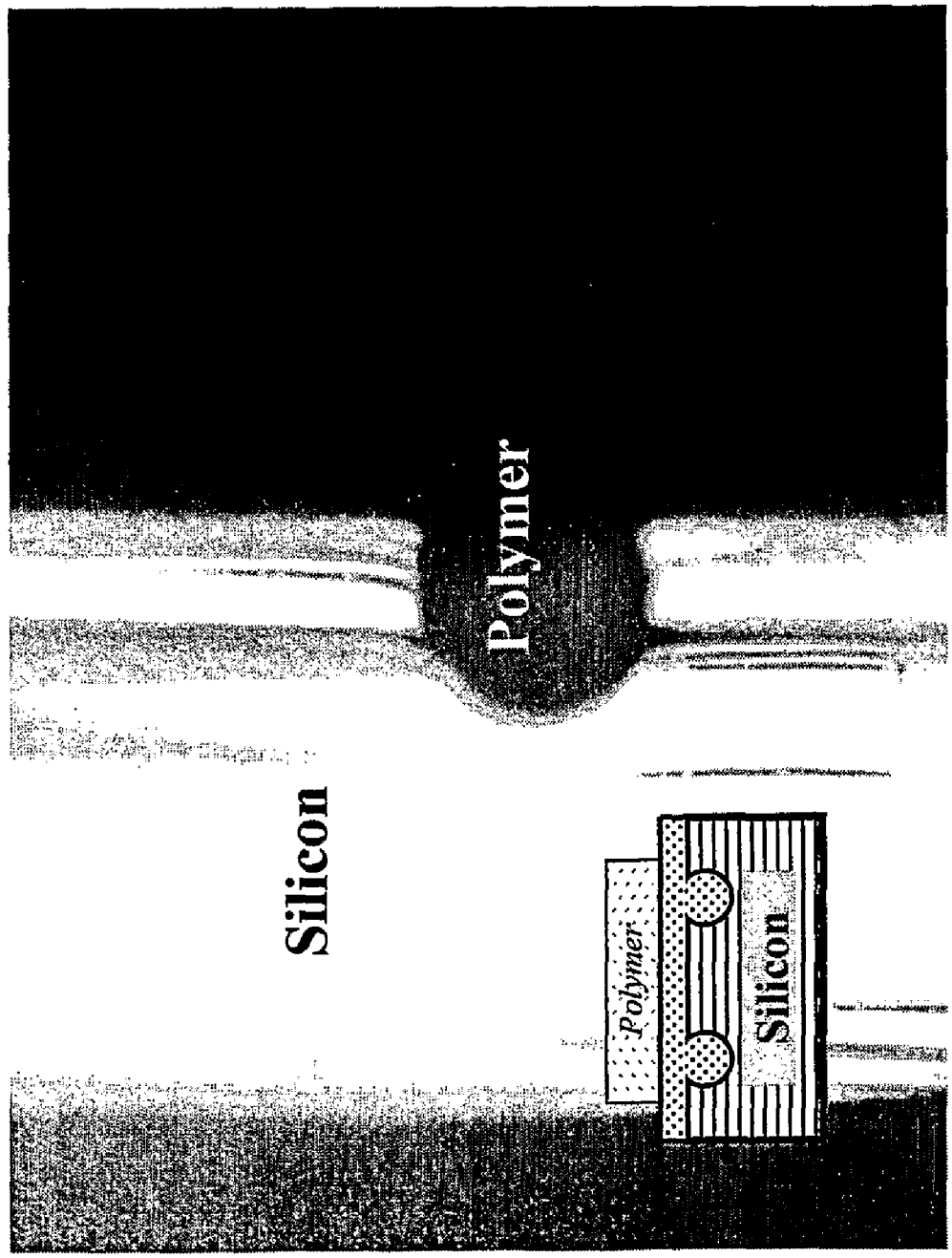
Figure 7:
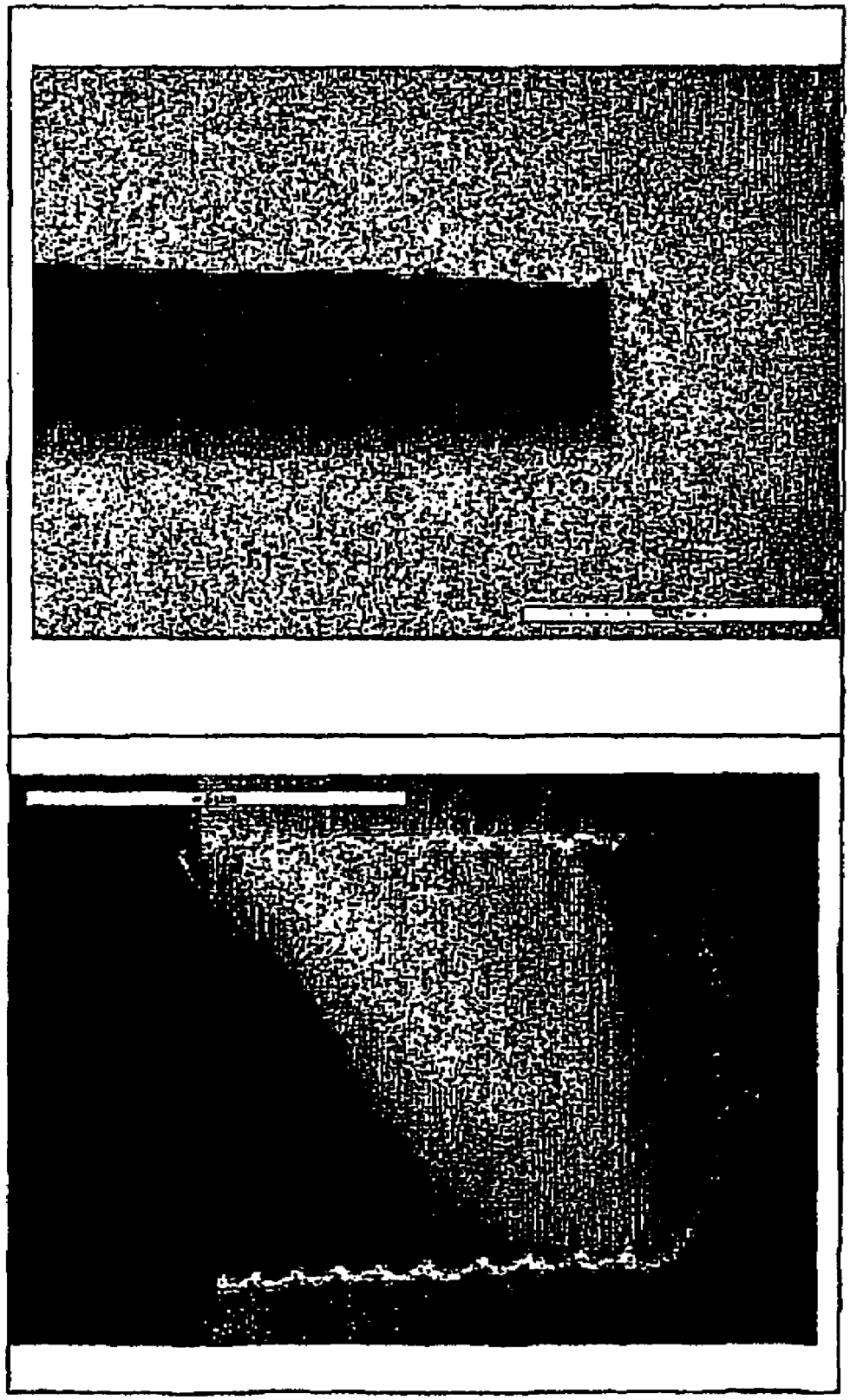
FIG. 7 provides SEM images of vertical tubular holes, before and after oxidations.

FIG. 6A provides an image of an embedded tubular hole in Silicon. FIG. 6B provides an image of an embedded tubular hole in silicon after oxidation. FIG. 6C provides images of embedded tubular holes in silicon. FIG. 6D provides an image of an optical waveguide created after filling a tubular hole with a polymer. FIG. 7 provides SEM pictures of vertical tubular hole, before (left) and after (right) oxidation.

It is noted that all of the technology disclosed herein is relevant to other applications other than waveguides. One some embodiments, diverse fluids are allowed to flow inside the hollow tubular cavities, i.e. the step of filling is avoided. Micro-fluidic systems can find application, in chemical reactions and cooling semiconductor devices (VLSI, lasers etc.).

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A device comprising:
   a) a substrate having a substantially planar surface; and
   b) an elongated channel at least partially buried within said substrate, at least part of said elongated channel being located beneath at least a portion of said substrate, said elongated channel being configured as a waveguide for electromagnetic radiation; and
   c) a core of a substantially solid material different from the material of said substrate extending within said elongated channel, said core being substantially transparent to electromagnetic radiation; and
   d) a cladding substantially surrounding said core, said cladding having a lower refractive index than a refractive index of said core.

2. The device of claim 1 wherein said cladding is a portion of said substrate chemically modified.

3. The device of claim 1 where said substrate is silicon.

4. The device according to claim 1 wherein at least 70% of a width of said elongated channel is located beneath said substrate.

5. The waveguide of claim 1 wherein said cladding includes a material selected from the group consisting of an oxide and a nitride.

6. A device comprising:
   a) a substrate having a substantially planar surface; and
   b) an elongated channel at least partially buried within said substrate, at least part of said channel being located beneath at least a portion of said substrate, wherein said channel is configured as a hollow waveguide for electromagnetic radiation; and
   c) an access channel traversing said substrate between said at least partially buried elongated channel and said surface of said substrate.

7. The device of claim 6 wherein an inner surface of said elongated channel is coated with a substantially highly reflective coating.

8. The device according to claim 6 wherein at least 70% of a width of said elongated channel is located beneath said substrate.

9. The device of claim 6 wherein said access channel is substantially sealed.

10. A waveguide comprising:
    a) a substrate having an upper surface and a lower surface;
    b) an elongated traversing channel between said upper and lower surface of said substrate, said channel traversing a thickness of said substrate; and
    c) a core of a substantially solid material other than a material of said substrate extending within said channel, said core being substantially being transparent to electromagnetic radiation having a wavelength; and
    d) a cladding substantially surrounding said core, said cladding having a refracting index that is less than a refractive index of said core,
    wherein said core and said cladding are substantially transparent to electromagnetic radiation, and wherein an outer surface of said cladding is molded to an inner surface of said channel.

11. The waveguide of claim 10 wherein said cladding is a portion of said substrate chemically modified.

12. A method of manufacturing a waveguide the method comprising:
    a) providing a substrate having a substantially planar surface;
    b) forming, within said substrate (i) an access channel, and (ii) an elongated channel, said elongated channel at least partially buried within said substrate at least part of said elongated channel being located beneath at least a portion of said substrate, said access channel traversing said substrate between said at least partially buried elongated channel and said surface of said substrate; and
    c) configuring said elongated channel to function as a waveguide,
    wherein said configuring includes at least partially filling said substantially elongated channel with a core of a substantially solid material extending within said elongated channel, said core being substantially transparent to electromagnetic radiation, said substantially solid material of said core different from material of said substrate.

13. The method of claim 12 wherein said filling includes introducing a fluid into said at least partially elongated buried elongated channel through said access channel and subjecting said liquid to a solidification process.

14. The method of claim 12 wherein said configuring includes configuring an inner surface of said elongated channel to be reflective.

15. The method of claim 14 wherein elongated said channel having said reflective inner surface is substantially hollow.

16. The method of claim 12 said configuring includes introducing a sealing material above said partially buried elongated channel to seal said elongated channel from above.

17. The method of claim 16 wherein said introducing of said sealing material includes subjecting said substrate above said elongated channel to a chemical reaction, and said elongated channel is sealed with said reacted substrate.

18. The method of claim 17 wherein said introducing of said sealing material includes depositing said sealing material above said elongated channel.

19. The method of claim 12 wherein said substrate is silicon.

20. A method of manufacturing a waveguide, the method comprising:
    a) providing a substrate having a substantially planar surface;
    b) forming, within said substrate (i) an access channel, and (ii) an elongated channel, said elongated channel at least partially buried within said substrate at least part of said channel being located beneath at least a portion of said substrate, said access channel traversing said substrate between said at least partially buried elongated channel and said surface of said substrate; and c) configuring said channel to function as a hollow waveguide.

21. A method of manufacturing a sealed buried channel, the method comprising:
   a) providing a substrate having a substantially planar surface;
   b) forming, within said substrate, (i) an access channel, and (ii) an elongated channel, said elongated channel at least partially buried within said substrate, at least part of said elongated channel being located beneath at least a portion of said substrate, said access channel traversing said substrate between said at least partially buried elongated channel and said surface of said substrate;
   c) forming a core within said elongated channel by at least partially filling said substantially elongated channel with a core of a substantially solid material extending within said elongated channel, said substantially solid material of said core being different from material of said substrate, said formed core being substantially transparent to electromagnetic radiation; and
   d) subjecting said substrate above said partially buried elongated channel to a chemical reaction to seal said access channel, thereby sealing said elongated channel from above.

22. A method of manufacturing a waveguide, the method comprising:
   a) providing a substrate having an upper surface and a lower surface;
   b) forming an elongated traversing channel between said upper and lower surface of said substrate, said channel traversing a thickness of said substrate; and
   d) introducing into said channel a core and cladding of substantially solid material, said core and said cladding being substantially transparent to electromagnetic radiation such that an outer surface of said cladding is molded to an inner surface of said channel and such that said cladding substantially surrounds said core, said cladding having a refracting index that is less than a refractive index of said core.

23. The method of claim 22 wherein:
   i) a width of said formed channel varies along an elongation axis of said channel; and
   ii) a width of said channel is a substantially monotonically increasing or decreasing function of a position along an elongate axis of said channel,
   iii) a variation of a width of said channel along said elongation axis of said channel includes a periodic variation; and
   iv) said forming of said channel includes iteratively etching a hole to enlarge a hole width, and deposition of an substantially rigid auxiliary material on an inner surface of said etched hole, and at least one of an amplitude of said periodic variation and a period distance of said periodic variation is determined at least in part by at least one of a strength of said etching process and a deposition thickness of said substantially rigid auxiliary material.

24. The method of claim 22 wherein:
   i) a variation of a width of said channel along an elongation axis of said channel includes a periodic variation; and
   ii) said channel is configured to have wavelength filtering properties.

25. A device comprising:
   a) a substrate having a substantially planar surface; and
   b) an elongated channel at least partially buried within said substrate, at least part of said elongated channel being located beneath at least a portion of said substrate, said elongated channel being configured as a waveguide for electromagnetic radiation;
   c) a core of a substantially solid material different from the material of said substrate extending within said channel, said core being substantially transparent to electromagnetic radiation; and
   d) an access channel traversing said substrate between said at least partially elongated buried channel and said surface of said substrate.

26. The device of claim 25 wherein said access channel is substantially sealed.

27. The device of claim 25 further comprising: e) a cladding substantially surrounding said core, said cladding having a lower refractive index than a refractive index of said core.

28. The device of claim 27 wherein said cladding is a portion of said substrate chemically modified.

29. A method of manufacturing, the method comprising:
   a) providing a substrate having a substantially planar surface;
   b) forming an elongated channel at least partially buried within said substrate, at least part of said channel being located beneath at least a portion of said substrate; and
   c) configuring said channel to function as a waveguide, wherein said configuring includes:
      i) at least partially filling said substantially elongated channel with a core of a substantially solid material extending within said channel, said core being substantially transparent to electromagnetic radiation, substantially solid material being different from the material of said substrate,
      ii) introducing a cladding substantially surrounding said core,
   said cladding having a lower refractive index than a refractive index of said core.

30. The method of claim 29 wherein said introducing of said cladding includes at least one of:
   i) chemically transforming an inner surface of said channel; and
   ii) subjecting an inner surface of said channel to a deposition process.

31. The method of claim 29 wherein said chemical transforming includes oxidizing said substrate.

* * * * *